United States Patent
Popovich et al.

(10) Patent No.: US 9,464,779 B2
(45) Date of Patent: Oct. 11, 2016

(54) APPARATUS FOR CONDENSING LIGHT FROM MULTIPLE SOURCES USING BRAGG GRATINGS

(71) Applicant: SBG Labs Inc., Sunnyvale, CA (US)

(72) Inventors: Milan Momcilo Popovich, Leicester (GB); Jonathan David Waldern, Los Altos Hills, CA (US)

(73) Assignee: DIGILENS, INC., Sunnyvale, CA (US)

( * ) Notice: Subject to any disclaimer, the term of this patent is extended or adjusted under 35 U.S.C. 154(b) by 161 days.

(21) Appl. No.: 14/134,681

(22) Filed: Dec. 19, 2013

(65) Prior Publication Data

US 2014/0185286 A1     Jul. 3, 2014

Related U.S. Application Data

(62) Division of application No. 12/444,315, filed as application No. PCT/US2006/041689 on Oct. 27, 2006, now Pat. No. 8,634,120.

(60) Provisional application No. 60/739,690, filed on Nov. 25, 2005.

(30) Foreign Application Priority Data

Nov. 11, 2005 (GB) .................................. 0522968.7

(51) Int. Cl.
*G02B 5/18* (2006.01)
*F21V 5/04* (2006.01)
(Continued)

(52) U.S. Cl.
CPC . *F21V 5/04* (2013.01); *F21K 9/56* (2013.01); *G02B 5/32* (2013.01); *G02B 27/102* (2013.01);
(Continued)

(58) Field of Classification Search
CPC ............. F21V 5/04; F21V 9/56; G02B 5/42; G02B 5/203; G02B 27/42; G02B 27/102; G02B 27/0905; G02B 27/0944; G02B 27/1053; G02B 27/1073; G02B 27/1086; H04N 9/3152; H04N 9/3164; H04N 9/3197; G02F 2001/133607; G02F 2001/133613; G02F 2203/62
USPC ........ 359/15, 22, 24, 489.19, 566, 573, 618, 359/634; 353/30, 31; 349/5, 201, 231
See application file for complete search history.

(56) References Cited

U.S. PATENT DOCUMENTS 5,751,452 A   5/1998   Tanaka et al.
5,942,157 A   8/1999   Sutherland et al.
(Continued)

FOREIGN PATENT DOCUMENTS

JP       02186319 A     7/1990
WO       2005073798     8/2005

OTHER PUBLICATIONS

R. L. Sutherland, L. V. Natarajan, V. P. Tondiglia. Bragg Gratings in an Acrylate Polymer Consisting of Periodic Polymer-Dispersed Liquid-Crystal Planes. Chem. Mater. May 1993, 1533-1538.*
(Continued)

*Primary Examiner* — Bumsuk Won
*Assistant Examiner* — Collin X Beatty
(74) *Attorney, Agent, or Firm* — Brooks Kushman P.C.

(57) ABSTRACT

There is provided a color sequential illumination device comprising in series: first and second light sources; a condenser lens; and a grating device. The grating device comprises at least one Bragg grating. The condenser lens directs light from the first and second sources into the grating device at first and second incidence angles respectively. The grating device diffracts light from the first and second sources into a common direction. Desirably, the Bragg gratings are Electrically Switchable Bragg Gratings. In one embodiment of the invention the light sources are Light Emitting Diodes. Alternatively lasers may be used.

16 Claims, 23 Drawing Sheets

(51) Int. Cl.
*G02B 5/32* (2006.01)
*G02B 27/10* (2006.01)
*H04N 9/31* (2006.01)
*F21K 99/00* (2016.01)
*G02B 27/42* (2006.01)
*G02F 1/1335* (2006.01)

(52) U.S. Cl.
CPC ........... *G02B 27/1086* (2013.01); *G02B 27/42* (2013.01); *H04N 9/3152* (2013.01); *H04N 9/3164* (2013.01); *G02F 2001/133607* (2013.01); *G02F 2001/133613* (2013.01); *G02F 2203/62* (2013.01)

(56) References Cited

U.S. PATENT DOCUMENTS

| | | | |
|---|---|---|---|
| 5,999,282 | A | 12/1999 | Suzuki et al. |
| 6,115,152 | A | 9/2000 | Popovich et al. |
| 6,133,971 | A | 10/2000 | Silverstein et al. |
| 6,211,976 | B1 | 4/2001 | Popovich et al. |
| 6,317,228 | B2* | 11/2001 | Popovich ..................... 349/201 |
| 6,646,772 | B1 | 11/2003 | Popovich et al. |
| 2002/0126332 | A1* | 9/2002 | Popovich ................. G02B 5/32 359/15 |
| 2003/0107809 | A1 | 6/2003 | Chen et al. |
| 2010/0097674 | A1 | 4/2010 | Kasazumi et al. |

OTHER PUBLICATIONS

Harbers et al., "Performance of High-Power LED illuminators in Projection Displays", Proc. Int. Disp. Workshops, Japan. vol. 10, pp. 1585-1588, 2003.

Hasman et al., "Diffractive Optics: Design, Realization, and Applications", Fiber and Integrated Optics, 16:1-25, 1997.

Hariharan, P., "Optical Holography: Principles, techniques and applications", Cambridge University Press, 1996, pp. 231, 233.

Butler et al., "Diffractive Properties of Highly Birefringent Volume Gratings: Investigation", Journal of Optical Society of America, vol. 19, No. 2, pp. 183-189, 2002.

Kogelnik, "Coupled Wave Theory for Thick Hologram Gratings", The Bell System Technical Journal, vol. 48, No. 9, pp. 2909-2945, 1969.

Website http://www.edfi.co.jp/e/products/dac.html Rerieved from the Wayback Machine on Mar. 8, 2016, website dated Dec. 16, 2009, "E.D.I. Corporation, The DLP projector application". All together 5 Pages.

* cited by examiner

APPARATUS FOR CONDENSING LIGHT FROM MULTIPLE SOURCES USING BRAGG GRATINGS

CROSS-REFERENCE TO RELATED APPLICATIONS

This application is a division of U.S. patent application Ser. No. 12/444,315 filed Apr. 3, 2009, now U.S. Pat. No. 8,634,120 issued Jan. 21, 2014, which claims priority to United Kingdom patent application No. GB0516063.5, filed Nov. 11, 2005 and the benefit of U.S. provisional patent application No. 60/739,690 filed Nov. 25, 2005.

BACKGROUND OF THE INVENTION

This invention relates to an apparatus for illuminating a display, and more particularly to an illuminator device based on Bragg gratings.

Recent developments in microdisplays and Light Emitting Diode (LED) technology are driving the development of a range of consumer applications such as compact projectors and thin form factor rear projection televisions. Current microdisplays employ a variety of technologies including liquid crystals, micro-mechanical mirrors (MEMs) micro-mechanical diffraction gratings and others. Liquid Crystal Displays (LCDs) are the most well-known examples. The most efficient method of illuminating microdisplays is to present red, green and blue illumination sequentially with the display image data being updated in the same sequence. Such procedures require that the display update rate is fast enough for the sequential single-color images to appear to the observer as a full color image.

Prior art illumination system have employed color wheels which suffer from the problems of noise and mechanical complexity. FIG. 1 shows an example of a prior art illumination system. The illumination system comprises an incoherent light source 1001, condenser mirror 1002, focusing lens 1003, color wheel 1004, collimating lens 1005 and filter 1006. The ray directions are generally indicated by the arrowed lines 2000. A projection display would further comprise a microdisplay 1007 and a projection lens 1008 forming an image on a screen 1009. Illumination systems based on incoherent sources such as UHP lamps, for example, suffer from the problems of bulk, warm up time lag, high heat dissipation and power consumption, short lamp lifetime, noise (resulting from the color wheel) and poor color saturation.

Many of the above problems can be solved by using LED illumination. One commonly used illuminator architecture uses dichroic beam splitters known as X-cubes. The prior art illuminator shown in FIG. 2 comprises red, green and blue LED sources 1010a,1010b,1010c each comprising LED die and collimators, an X-cube 1011, focusing lens 1012, light integrator 1013, a further relay lens 1014 which directs light from the integrator onto the surface of a microdisplay 1015. The ray directions are generally indicated by the arrowed lines 2010. However, illuminators based on LEDs suffer from several problems. Although LEDs provide high lumen output they have large emittance angles, making the task of collecting and relaying light through the narrower acceptance cones of a microdisplay a very challenging optical design problem. LEDs require fairly large collimators, making it difficult to achieve compact form factors. LED triplet configurations using a shared collimation element suffer from thermal problems if the die are configured too closely. In the case of X-cube architectures such as the one shown in FIG. 2, the resulting image is barely bright enough, with the X-cube itself losing around one third of the light from the LEDs. X-cubes also present alignment, bulk and cost problems. Thus there exists a need for a compact, efficient LED illuminator for microdisplays Diffractive optical elements (DOEs) offer a route to solving the problems of conventional optical designs by providing unique compact form factors and high optical efficiency. DOEs may be fabricated from a range of recording materials including dichromated gelatine and photopolymers.

An important category of DOE known as an Electrically Switchable Holographic Bragg Gratings (ESBGs) is formed by recording a volume phase grating, or hologram, in a polymer dispersed liquid crystal (PDLC) mixture. Typically, ESBG devices are fabricated by first placing a thin film of a mixture of photopolymerizable monomers and liquid crystal material between parallel glass plates. Techniques for making and filling glass cells are well known in the liquid crystal display industry. One or both glass plates support electrodes, typically transparent indium tin oxide films, for applying an electric field across the PDLC layer. A volume phase grating is then recorded by illuminating the liquid material with two mutually coherent laser beams, which interfere to form the desired grating structure. During the recording process, the monomers polymerize and the HPDLC mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the PDLC layer. When an electric field is applied to the hologram via transparent electrodes, the natural orientation of the LC droplets is changed causing the refractive index modulation of the fringes to reduce and the hologram diffraction efficiency to drop to very low levels. Note that the diffraction efficiency of the device can be adjusted, by means of the applied voltage, over a continuous range from near 100% efficiency with no voltage applied to essentially zero efficiency with a sufficiently high voltage applied. U.S. Pat. Nos. 5,942,157 and 5,751,452 describe monomer and liquid crystal material combinations suitable for fabricating ESBG devices. A publication by Butler et al. ("Diffractive properties of highly birefringent volume gratings: investigation", Journal of the Optical Society of America B, Volume 19 No. 2, February 2002) describes analytical methods useful to design ESBG devices and provides numerous references to prior publications describing the fabrication and application of ESBG devices. DOEs based on HPDLC may also be used as non-switchable devices. Such DOEs benefit from high refractive index modulations.

Typically, to achieve a satisfactory display white point it is necessary to provide significantly more green than red or blue. For example, to achieve a white point characterised by a colour temperature of 8000K we require the ratio of red:green:blue light to be approximately 39:100:6. It is found in practice that providing adequate lumen throughput and white point simultaneously requires more than one green source. Although DOEs may be designed for any wavelength, providing a separate DOE for each source may be expensive and may lead to unacceptable attenuation and scatter when the elements are stacked. Methods for recording more than one grating into a hologram are well known. For example, one grating may be used to diffract light from two or more different sources. However such devices suffer from reduced diffraction efficiency and throughput limitations imposed by the etendue of a grating.

Another approach to combining light from more than one LED of a particular colour is to exploit the angle/wavelength selectivity of Bragg gratings. High efficiency can be provided in different incidence angle ranges for different wavelengths according to the well-known Bragg diffraction equation. However, if we consider the wavelength ranges of typical sources the resulting incidence angle range will not be sufficiently large to separate the LED die. For example, if green sources with peak wavelengths at the extremities of the green band of the visible spectrum were provided the resulting incidence angles would differ by just a few degrees. This would make it at best extremely difficult to integrate the LED die and condenser optics into a compact package.

There is a requirement for a compact, efficient LED illuminator based on Bragg gratings.

There is a further requirement for a compact and efficient illuminator capable of combining two light sources having similar peak wavelengths using a single grating.

There is a yet further requirement for a complete colour sequential illumination device in which light of at least one primary colour is provided by means of a single grating that combines light from more than one source.

SUMMARY OF THE INVENTION

It is an object of the present invention to provide compact, efficient LED illuminator based on Bragg gratings.

It is a further object of the present invention to provide a compact and efficient illuminator capable of combining two light sources having similar peak wavelengths using a single grating.

It is a yet further object if the present invention to provide a complete colour sequential illumination device in which light of at least one primary colour is provided by means of a single grating that combines light from more than one source.

The objects of the invention are achieved in a first embodiment comprising a LED module, a condenser lens and an Electrically Switchable Bragg Grating (ESBG) device configured as a stack of separately switchable ESBG layers. Said optical elements are aligned along an optical axis normal to the surface of each element Each ESBG layer is recorded in HPDLC sandwiched between transparent substrates to which transparent conductive coatings have been applied. Each ESBG has a diffracting state and a non-diffracting state. Each ESBG diffracts light in a direction substantially parallel to the optical axis when in said active state. However, each ESBG is substantially transparent to said light when in said inactive state. Each ESBG is operative to diffract at least one wavelength of red, green or blue light.

In a further embodiment of the invention the illuminator further comprises a diffractive optical element (DOE) for beam intensity shaping. The DOE is operative to alter the wavefronts of incident red green and blue light to control the spatial distribution of illumination. Diffusion characteristics may be built into the ESBG devices. The diffusing properties of the ESBGs and the CGH may be combined to produce a desired illumination correction.

In a further embodiment of the invention the ESBG device comprises a, green diffracting ESBG layer a red diffracting ESBG layer and a blue diffracting ESBG layer. The red and green LEDs are disposed with their emission axes in a common plane. The blue LED is disposed with its emission axis disposed in an orthogonal plane.

In alternative embodiments of the invention the red, green and blue LEDs may be configured to lie in a common plane.

In a further embodiment of the invention the ESBG device comprises a first ESBG into which two superimposed red and green Bragg gratings have been recorded and a second ESBG into which a blue Bragg grating has been recorded.

In a further embodiment of the invention the ESBG device comprises red and green diffracting layers only. The blue LED is disposed with its emission axis parallel to the optical axis. The light from the blue LED is collimated by the lens system but is not deflected by the ESBG instead continuing to propagate without substantial deflection parallel to the optical axis.

A further embodiment of the invention comprises a LED module, a condenser lens, a group of ESBGs configured as a stack of separately switchable ESBG layers, a DOE and a relay lens. Each ESBG layer is recorded in HPDLC sandwiched between transparent substrates to which transparent conductive coatings have been applied. Each ESBG has a diffracting state and a non-diffracting state. Each ESBG diffracts light in a direction substantially parallel to the optical axis when in said active state. However, each ESBG is substantially transparent to said light when in said inactive state. Each ESBG is operative to diffract at least one wavelength of red, green or blue light. The LED module comprises two green emitters, a blue emitter and a red emitter. The ESBG group comprises green diffracting ESBG layers and a red diffracting ESBG. The DOE is operative to alter the wave fronts of incident red green and blue light to control to spatial distribution of illumination at the display panel. The output from the DOE comprises diffused light. Advantageously, the DOE is a Computer Generated Hologram (CGH) operative to diffract and diffuse red green and blue light. The ESBGs may also have diffusing properties that operate on light at the diffraction wavelength. The diffusing properties of the ESBGs and the CGH may be combined to produce a desired illumination correction In a further embodiment of the invention light from at least one LED is directed towards the ESBG device by means of a dichroic beam splitter.

In further embodiments of the invention elements of the illuminator may be configured in folding configurations to provide a compact form factor when the apparatus is not in use In further embodiment of the invention the LED die are disposed on a curved substrate.

In further embodiment of the invention refracting elements are disposed in front of each LED die to modify the LED emission angular distribution.

In a further embodiment of the invention a polarization insensitive illuminator is provided in which the ESBG groups in any of the above embodiments further comprise a half wave plate and further ESBG layers.

In alternative embodiments of the invention the ESBGs may be replaced by non-switchable Bragg gratings. In such alternative embodiments colour sequential illumination is provided by switching red, green and blue LEDs in sequence.

In preferred operational embodiments of the invention more efficient use of LED emission may be achieved by running two identical pulse sequentially driven LEDs.

In a further embodiment of the invention the illuminator further comprises a polarization rotating filter operative to rotate the polarization of at least one primary colour through ninety degrees.

In a further embodiment of the invention the illuminator may incorporate at least one light guide for one or more of the red green and blue lights. The light guide is disposed in the optical path between the LEDs and the ESBG device.

In further embodiments of the invention diffusing characteristics are encoded within one or more of the Bragg gratings.

In alternative embodiment of the invention the LED module comprises a multiplicity of emitters arranged in a circular pattern on a substrate. The ESBGs are disposed on a rotating substrate containing at least one ESBG.

In an alternative embodiment of the invention the ESBGs are disposed on a rotating substrate. The ESBG configuration comprises two displaced ESBGs disposed such that while one ESBG overlaps the beam path of a first LED, the second ESBG is ready to overlap the beam path of an adjacent LED.

In an alternative embodiment of the invention the illuminator comprises an LED module comprising a substrate and an array of LED die, a printed circuit board containing apertures, an array of lens elements disposed on a substrate and a stack of ESBGs.

In a further embodiment of the invention directed at providing a compact and efficient illuminator capable of combining two light sources having similar peak wavelengths using a single grating there is provided an illuminator comprising: a first LED characterised by a first wavelength; a second LED characterised by said first wavelength; a collimating lens; and a first Bragg grating. The grating is recorded by means of a first recording beam incident normal to the grating and a second recording beam incident at an angle to the grating. The lens collimates and directs light from the first and second LEDs towards said grating at first and second angles respectively. The second angle is substantially equal to the incidence angle of the second recording beam. The grating has a maximum acceptance angle for light beams whose average direction corresponds to that of said first recording beam, said acceptance angle being defined by the angle at which the diffraction efficiency of said grating falls to a predetermined value. The first angle is greater than said maximum acceptance angle. The normal to the surface of the grating defines an illumination direction. The first grating diffracts light from said second LED into said illumination direction.

In a further embodiment of the invention directed at providing a compact and efficient illuminator capable of combining two light sources having similar peak wavelengths using a single ESBG there is provided an illuminator comprising: a first LED characterised by a first wavelength; a second LED characterised by said first wavelength; a collimating lens; and a first ESBG. The ESBG is recorded by means of a first recording beam incident normal to the ESBG and a second recording beam incident at an angle to the ESBG. The lens collimates and directs light from the first and second LEDs towards said ESBG at first and second angles respectively. The second angle is substantially equal to the incidence angle of the second recording beam. The ESBG has a maximum acceptance angle for light beams whose average direction corresponds to that of said first recording beam, said acceptance angle being defined by the angle at which the diffraction efficiency of said ESBG falls to a predetermined value. The first angle is greater than said maximum acceptance angle. The normal to the surface of the ESBG defines an illumination direction. The first ESBG diffracts light from said second LED into said illumination direction.

In one particular embodiment of the invention directed at providing a complete colour sequential illumination device in which light of at least one primary colour is provided by means of a single grating that combines light from more than one source there is provide an illuminator comprising: a holographic optical element into which superimposed third and fourth Bragg gratings have been recorded; a third LED emitting light of a second wavelength; and a fourth LED emitting light of a third wavelength. The lens diffracts said second and third wavelength light at a third and fourth angles respectively with respect to said holographic optical element. The second and third wavelength light is diffracted into a direction normal to said holographic optical element.

In a further embodiment of the invention based on said particular embodiment the Bragg grating is a first ESBG and the holographic optical element is a second ESBG.

In a further embodiment of the invention based on said particular embodiment the Bragg grating is a first ESBG and the holographic optical element is a second ESBG. The apparatus further comprises in series a half wave plate; a third ESBG and a fourth ESBG. The third ESBG is identical to said first ESBG and the fourth ESBG is identical to said second ESBG.

A more complete understanding of the invention can be obtained by considering the following detailed description in conjunction with the accompanying drawings wherein like index numerals indicate like parts. For purposes of clarity details relating to technical material that is known in the technical fields related to the invention have not been described in detail.

DETAILED DESCRIPTION OF THE INVENTION

Figure 3:
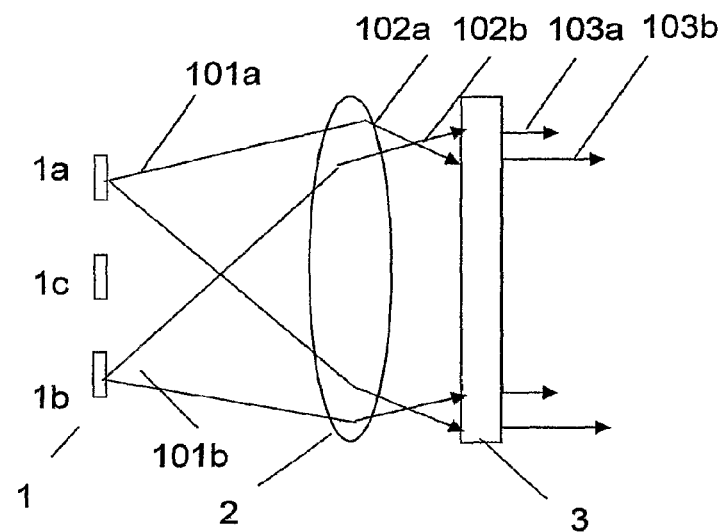
FIG. 3 is a schematic side elevation view of a further embodiment of the invention.

FIG. 3 shows a schematic side elevation view of a first embodiment of the invention. The illuminator comprises the LED module 1, condenser lens 2, and an ESBG device configured as a stack of separately switchable ESBG layers. Said optical elements are aligned along an optical axis normal to the surface of each element Each ESBG layer is recorded in HPDLC sandwiched between transparent substrates to which transparent conductive coatings have been applied. Each ESBG has a diffracting state and a non-diffracting state. Each ESBG diffracts light in a direction substantially parallel to the optical axis when in said active state. However, each ESBG is substantially transparent to said light when in said inactive state. Each ESBG is operative to diffract at least one wavelength of red, green or blue light. As shown in FIG. 3 the LED module comprises emitters 1a, 1b, 1c which would normally comprised red green and blue LEDs. Although only one LED of each colour is shown in FIG. 3 more than one LED of a particular primary colour may be used. Embodiments in which, for example, two green LEDs, one red and one blue LED are used will be discussed later. The collimator lens collimates light 101a, 101b,101c from LEDs 10a, 10b,10c to provide the substantially collimated beams 102a,102b,102c respectively. In certain embodiments of the invention the ESBG device may be designed such that a particular primary colour is not diffracted. In other words an ESBG is not provided for that particular colour.

Figure 1:
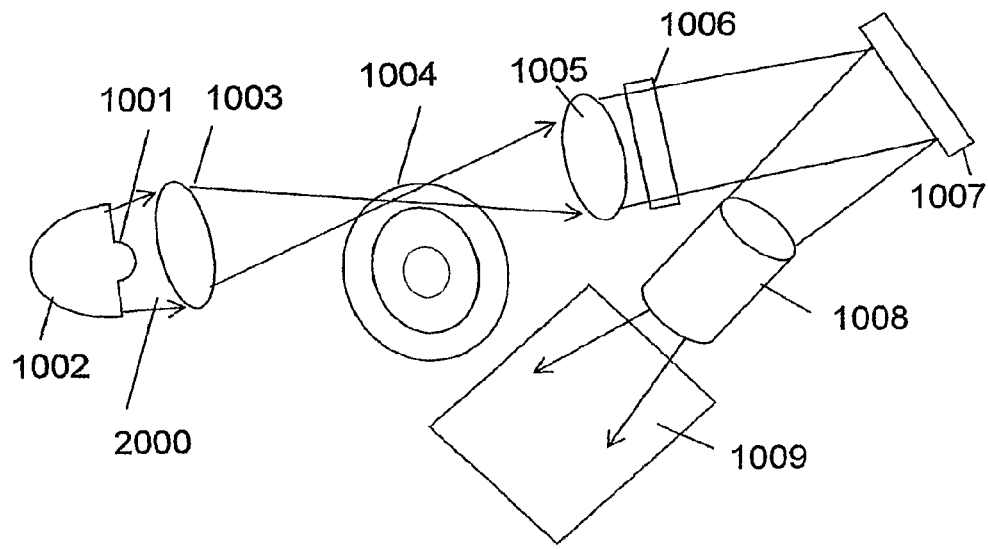
FIG. 1 is a schematic side view of a first prior art illuminator.
Figure 2:
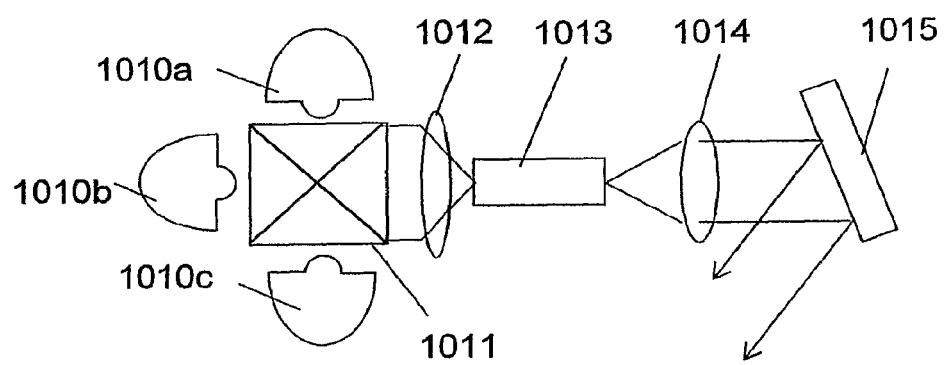
FIG. 2 is a schematic side elevation view of a second prior art illuminator.
Figure 4:
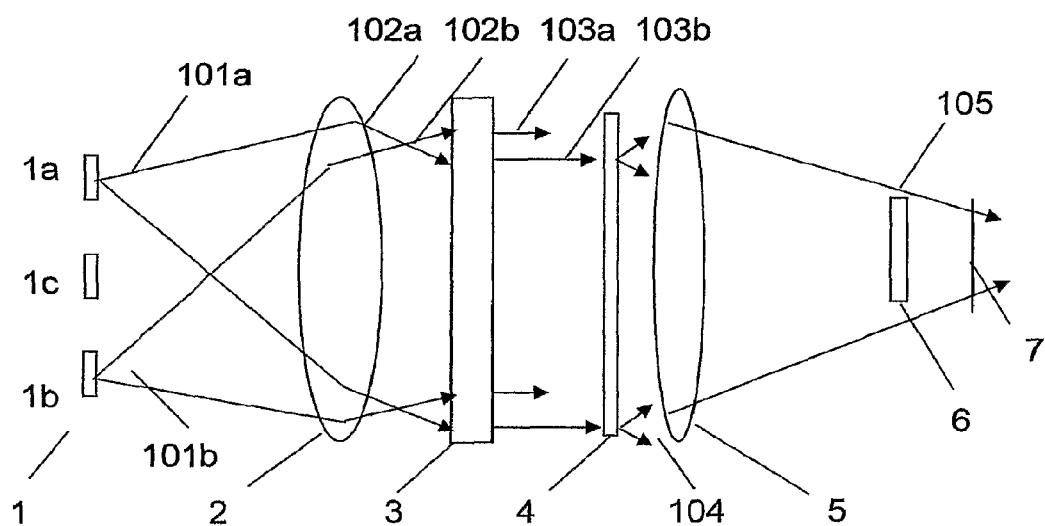
FIG. 4 is a schematic side elevation view of a further embodiment of the invention.

FIG. 4 shows a schematic side elevation view of an illuminator according to the first embodiment of the invention. The apparatus includes the elements of FIG. 2A and further comprises a Diffractive Optical Element (DOE) 4 and a relay lens 5. A complete display system further comprises the microdisplay panel 6. The illuminator forms a diffused image of the LED die at a surface 7. Typically said image surface is located close to the surface of the microdisplay. The microdisplay may any type of transmissive or reflective array device. The microdisplay does not form part of the present invention. The DOE 4 is operative to alter the wavefronts of incident red green and blue light to control to spatial distribution of illumination at the display panel. The output from the DOE 4 comprises diffused light as generally indicated by 104. Non-uniformities to be corrected by the DOE may be contributed by the LED polar distributions, vignetting aberrations and other factors. Advantageously, the DOE is a Computer Generated Hologram (CGH) operative to diffract and diffuse red green and blue light. The basic principles of the design and fabrication of CGH devices suitable for use in the present invention are discussed in references such as. "Digital Diffractive Optics: An Introduction to Planar Diffractive Optics and Related Technology" by B. Kress and P. Meyrueis, published in 2000 by John Wiley & Sons Inc. The ESBGs may also have diffusing properties that operate on light at the diffraction wavelength. The required diffusion characteristics may be built into the ESBG devices using procedures well known to those skilled in the art of Holographic Optical Elements (HOEs). The diffusing properties of the ESBGs and the CGH may be combined to produce a desired illumination correction.

Figure 5:
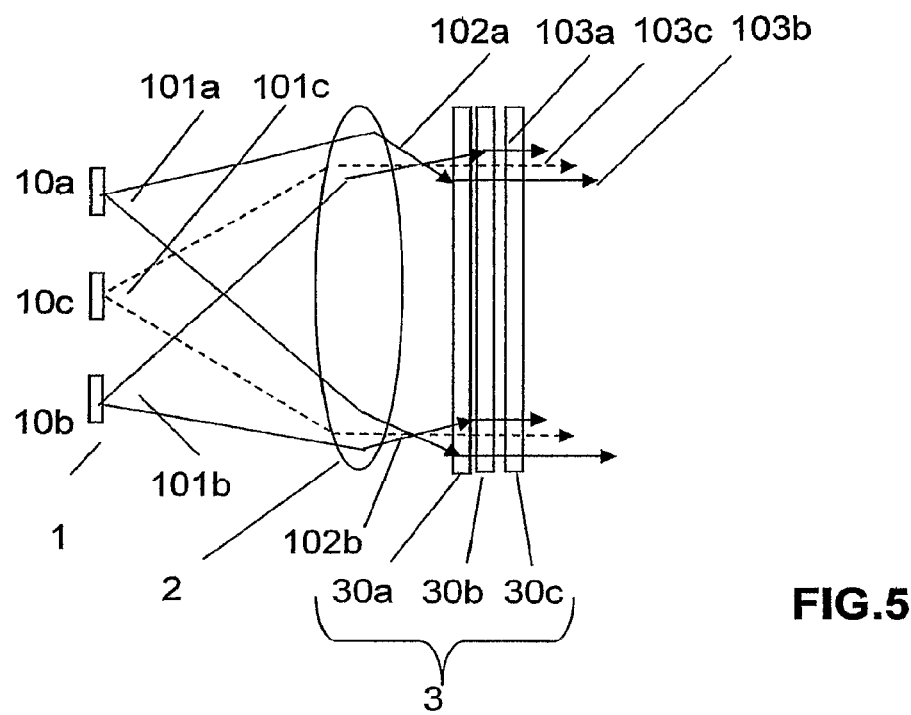
FIG. 5 is a schematic side elevation view of a further embodiment of the invention.
Figure 6:
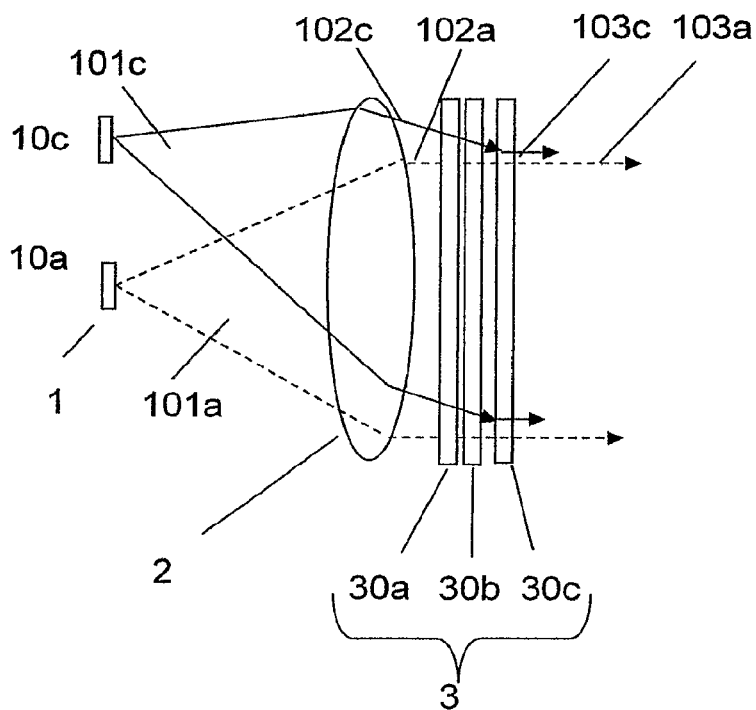
FIG. 6 is a schematic plan view of a further embodiment of the invention.

FIG. 5-6 show a schematic side elevation and plan views respectively of a further embodiment of the invention in which one particular embodiment of the ESBG device is shown in detail. The ESBG group comprises green diffracting ESBG layer 30a, a red diffracting ESBG layer 30b and a blue diffracting ESBG layer 30c. The red and green LEDs 10a,10b are disposed in a common plane. The blue LED 10c is disposed in the orthogonal plane. The ESBG layers 30a,30b,30c diffract the beam 102a,102b,102c into the directions 103a,103b,103c respectively where directions 103a,103b,103c are substantially parallel to the optical axis. In each projection the rays around a mean direction normal to the page are indicated by dashed lines. The ESBG layers further comprise means for applying a voltage, across the electrodes of each ESBG cell and logic circuits for controlling the sequence in which the ESBGs are activated. In alternative embodiments related to the one illustrated in FIGS. 5-6 the three LEDs may be configured to lie in a common plane. In such a configuration it would not be practical for the blue LED to be configured with its emission axis normal to the ESBG device. To provide efficient diffraction parallel to the optical axis the blue LED emission axis should be configured at an off axis angle within the plane contained the emission axis of the LEDs.

Color sequential illumination of the microdisplay is provided using the following steps. The first step comprises switching on the green LED switching off the blue and red LEDS, deactivating the red ESBG using an applied electric field, the green diffracting ESBG remaining in a diffracting state, and updating the display with green picture information. The second step comprises switching on the red LED switching off the blue and green LEDs, deactivating the green ESBG using an applied electric field, the red diffracting ESBG now changing to its diffracting state, and updating the display with red picture information. The third step comprises switching on the blue LED switching off the green and red LEDs, deactivating the red ESBG using an applied electric field, the green diffracting ESBG remaining in a diffracting state, and updating the display with blue picture information. Note that the switching of the ESBGs would normally take place during the display refresh period.

Figure 7:
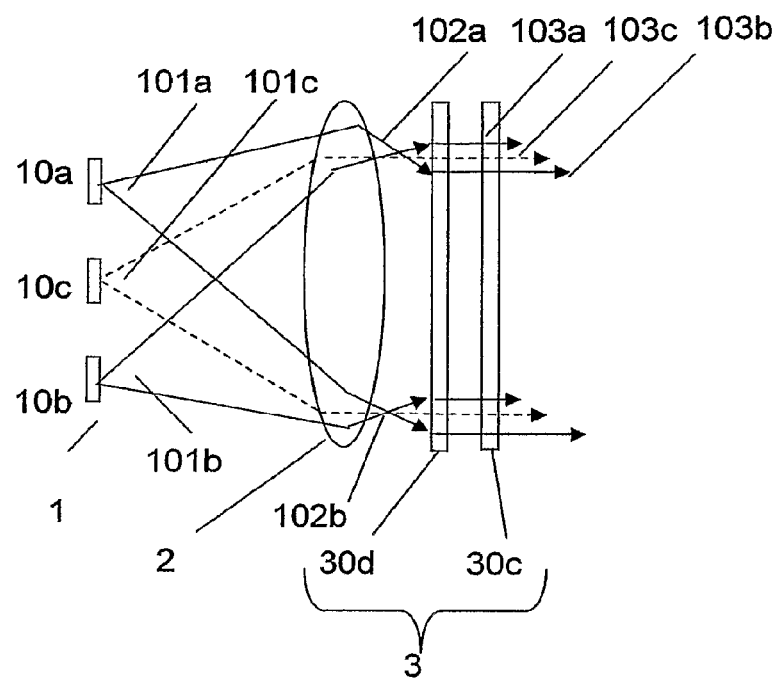
FIG. 7 is a schematic side elevation view of a further embodiment of the invention.
Figure 8:
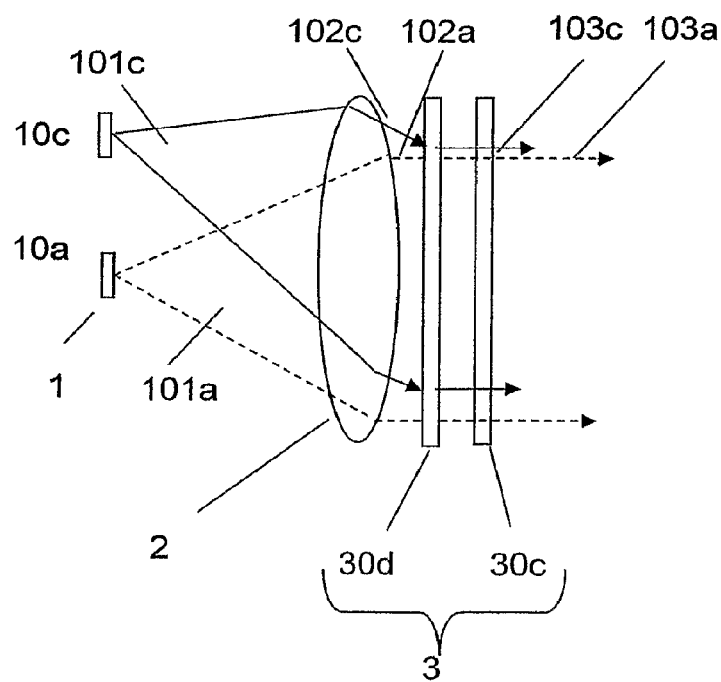
FIG. 8 is a schematic plan view of a further embodiment of the invention.

FIGS. 7-8 show schematic side elevation and plan views respectively of a further embodiment of the invention. In FIGS. 7-8 the ESBG device comprises a first ESBG 30d into which two superimposed red and green Bragg gratings have been recorded and a second blue diffracting ESBG 30c. Such a configuration may allow more flexibility in the choice of incident angles. The basic principles of recording multiple superimposed gratings will be well known to those skilled in the art of holography and is discussed in textbooks such as "Optical Holography" by R. J. Collier, C. B. Burkhardt and L. H. Lin published by Academic Press, New York (1971). However, as discussed in references such as Collier superimposed Bragg gratings suffer from reduced diffraction efficiency. The principles of operation of the illuminator are similar to those of the embodiment of FIGS. 5-6. In the case of the FIG. 7 embodiment the green and red ESBGs will be active simultaneously. Color sequential illumination of the microdisplay is provided using the following steps. The first step comprises switching on the green LED switching off the blue and red LEDs, deactivating the blue ESBG using an applied electric field, the red-green diffracting ESBG remaining in a diffracting state, and updating the display with green picture information. The second step comprises switching on the red LED switching off the blue and green LEDs and updating the display with red picture information. The third step comprises switching on the blue LED switching off the green and red LEDs, deactivating the red-green ESBG using an applied electric field, the blue diffracting ESBG remaining in a diffracting state, and updating the display with blue picture information. Note that the switching of the ESBGs would normally take place during the display refresh period.

Figure 9:
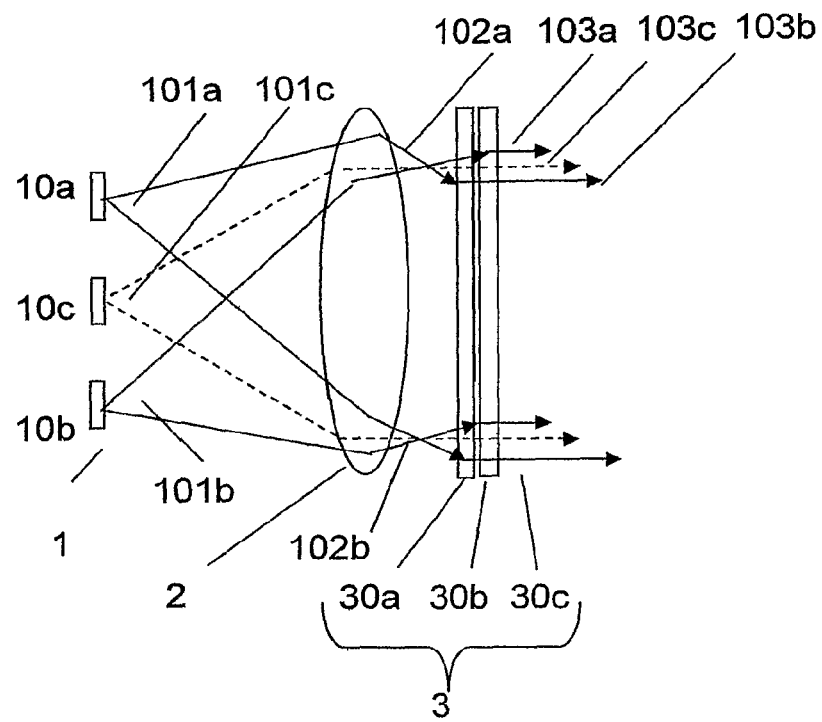
FIG. 9 is a schematic side elevation view of a further embodiment of the invention.
Figure 10:
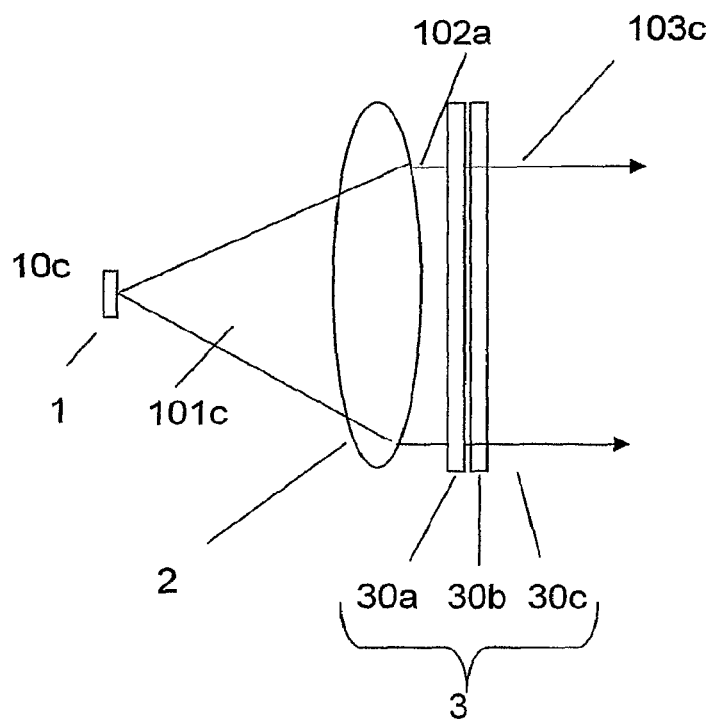
FIG. 10 is a schematic plan view of a further embodiment of the invention.

FIGS. 9-10 show schematic side elevation and plan views respectively of a further embodiment of the invention. In the embodiment illustrated, the ESBG device comprises red and green diffracting layers 30a,30b only. The blue LED 10c is disposed with its emission axis parallel to the optical axis. The light from the blue LED is collimated by the lens system 2 but is not deflected by the ESBG instead continuing to propagate without substantial deflection parallel to the optical axis.

Figure 11:
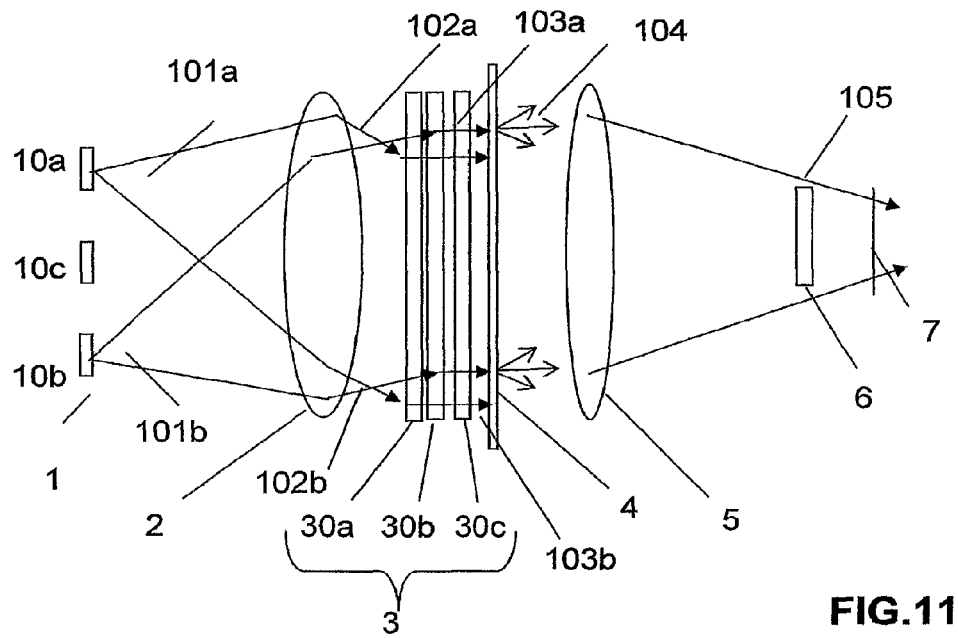
FIG. 11 is a schematic side elevation view of a further embodiment of the invention.
Figure 12:
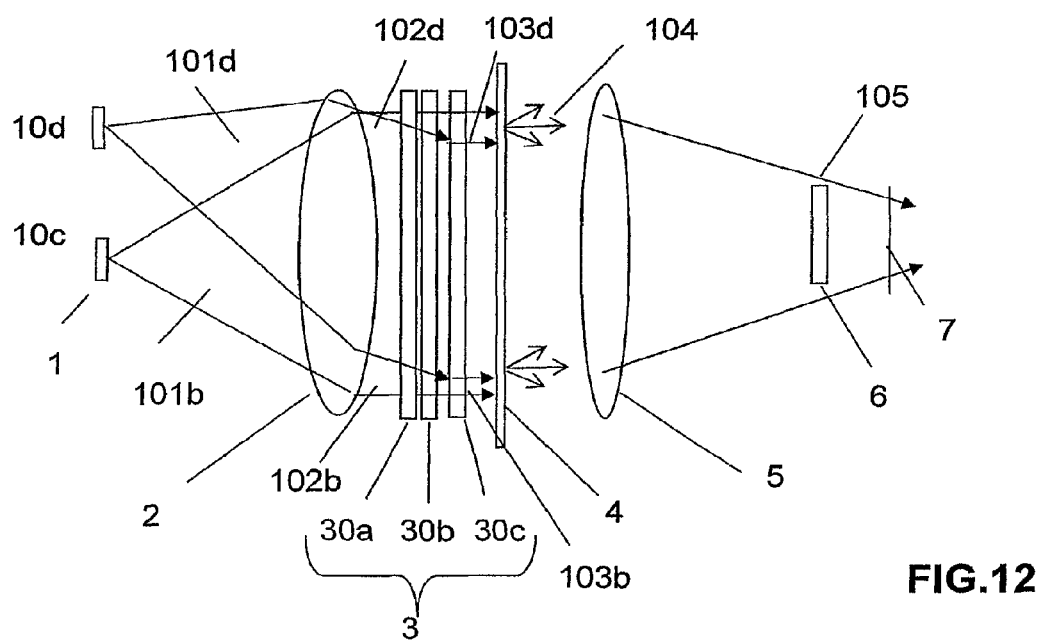
FIG. 12 is a schematic plan view of a further embodiment of the invention.

FIGS. 11-12 show schematic side elevation and plan views respectively of a first embodiment of the invention. The illuminator comprises the LED module 1, condenser lens 2, a group of ESBGs 3 configured as a stack of separately switchable ESBG layers, a DOE 4 and a relay lens 5. Said optical elements are aligned along an optical axis normal to the surface of each element. A complete projection system would further comprise the display panel 6. Each ESBG layer is recorded in HPDLC sandwiched between transparent substrates to which transparent conductive coatings have been applied. Each ESBG has a diffracting state and a non-diffracting state. Each ESBG diffracts light in a direction substantially parallel to the optical axis when in said active state. However, each ESBG is substantially transparent to said light when in said inactive state. Each ESBG is operative to diffract at least one wavelength of red, green or blue light.

As shown in FIG. 11 the LED module comprises two green emitters 10a, 10b, and a blue emitter 10c. As shown in FIG. 12, the LED module further comprises a red emitter 10d. The collimator lens collimates light 101a,101b,101c, 101d from LEDs 10a,10b,10c,10d to provide the substantially collimated beams 102a,102b,102c,102d respectively. The ESBG group comprises green diffracting ESBG layers 30a, 30b and a red diffracting ESBG layer 30c. The ESBG layers 30a,30b diffract the beam 102a,102b into the directions 103a,103b respectively where directions 103a,103b are substantially parallel to the optical axis. The ESBG layers further comprise means for applying a voltage, across the electrodes of each ESBG cell and logic circuits for controlling the sequence in which the ESBGs are activated. In the embodiment show in FIGS. 11-12 the light from the blue LED is not deflected by an ESBG after collimation but proceeds parallel to the optical axis. Color sequential illumination of the microdisplays is provided using the following steps. The first step comprises switching on the green LEDs switching off the blue and red LEDS, deactivating the red ESBG using an applied electric field, the green diffracting ESBGs remaining in a diffracting state, and updating the display with green picture information. The second step comprises switching on the red LED switching off the blue and green LEDS, deactivating the green ESBGs using an applied electric field, the red diffracting ESBG now changing to its diffracting state, and updating the display with red picture information. The third step comprises switching on the blue LED switching off the green and red LEDS, deactivating the red ESBG using an applied electric field, the green diffracting ESBGs remaining in a diffracting state, and updating the display with blue picture information.

In an alternative embodiment of the invention the red and green ESBGs may remain in the diffractive state during each of the above steps.

As indicated above, the DOE 4 is operative to alter the wavefronts of incident red green and blue light to control the spatial distribution of illumination at the display panel. The output from the DOE 4 comprises diffused light as generally indicated by 104. Non-uniformities may be contributed the LED polar distributions, vignetting aberrations and other factors.

A complete projection display according to any of the above embodiments further comprises a microdisplay 6 and a projection lens, which is not shown. It should be noted that the effect of the elements 2-5 is to form a diffused image of the LED die at a surface 7. Typically said image surface is located close to the microdisplay surface.

In applications where illumination uniformity is not important the DOE 4 may be eliminated.

In an alternative embodiment of the invention, which is also illustrated by FIG. 3, the ESBGs 31a,31b may each comprise an ESBG into which two superimposed red and green Bragg gratings have been recorded. Such a configuration may allow more flexibility in the choice of incident angles. The basic principles of recording multiple superimposed gratings will be well known to those skilled in the art of holography and is discussed in textbooks such as "Optical Holography" by R. J. Collier, C. B. Burkhardt and L. H. Lin published by Academic Press, New York (1971). However, as discussed in references such as Collier superimposed Bragg gratings suffer from reduced diffraction efficiency.

Figure 13:
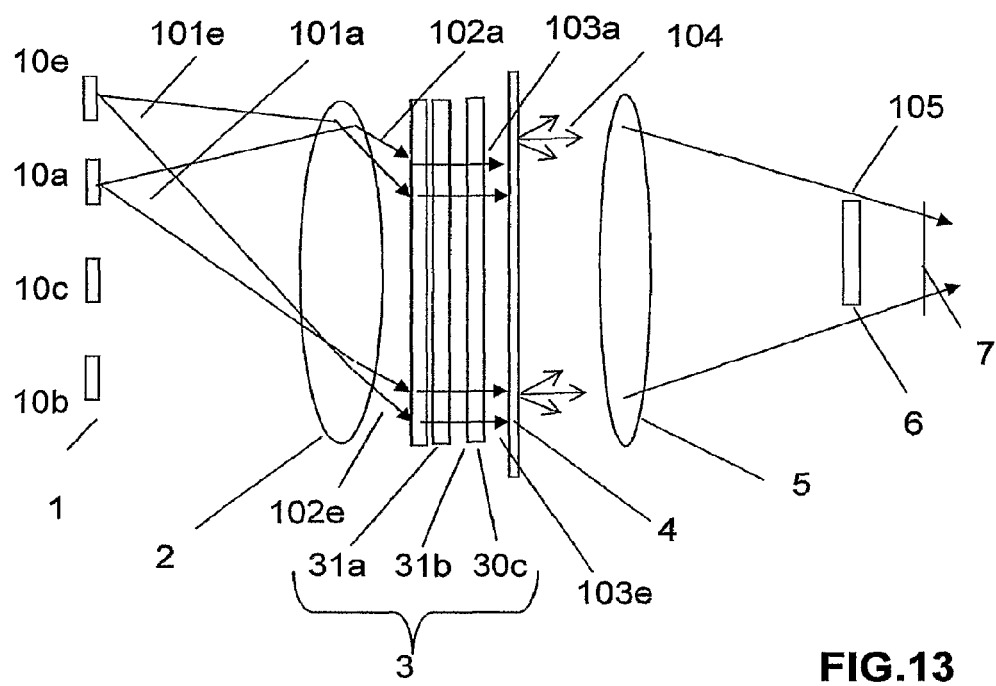
FIG. 13 is a schematic side elevation view of a further embodiment of the invention.

FIG. 13 shows an alternative embodiment of the invention similar to that illustrated in FIGS. 11-12. In the embodiment of FIG. 13 there is provided an ESBG that diffracts both red and green light. The red LED 10e is now disposed such that after collimation it provides light at a steeper incidence angle than the green LED 10a. The ESBGs 31a,31b relies on the property of Bragg holograms that high efficiency can be provided in different incidence angle ranges for different wavelengths according to the Bragg diffraction equation. In the case of the ESBGs 31a,31b, the ESBG is designed such that for said incident red and green light 101e,101a the diffracted light directions 102a,102e are substantially parallel to the optical axis. The red and green light, which is not diffracted, is trapped by a light-absorbing stop. The inventors have found that high diffraction efficiency is obtained when the ESBGs 31a,31b are designed to have incidence angles of 40° for green light and 50° for red light.

The inventors have shown that practical implementation of the embodiments of the invention shown in FIGS. 3-5 could provide a projection device having maximum dimensions 120 mm.×40 mm.×30 mm. where allowance has been made for a projection lens.

Figure 14:
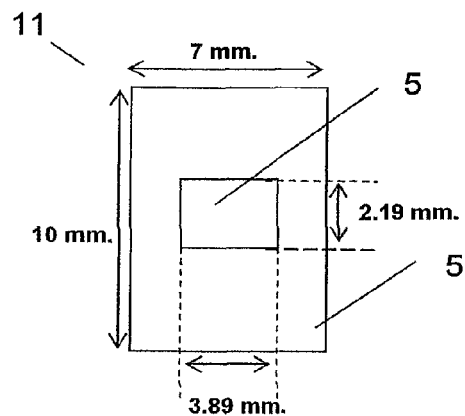
FIG. 14 is a front elevation view of an LED device.
Figure 15:
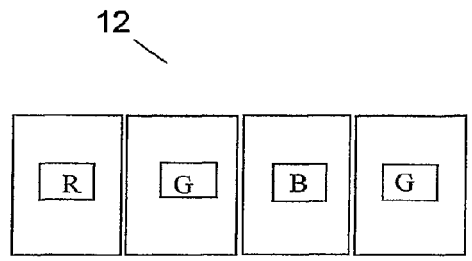
FIG. 15 is a schematic front elevation view of a first LED configuration.
Figure 16:
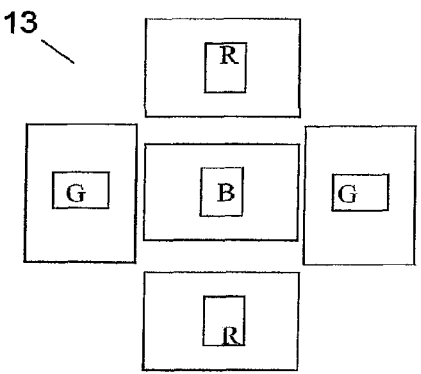
FIG. 16 is a schematic front elevation view of a second LED configuration.
Figure 17:
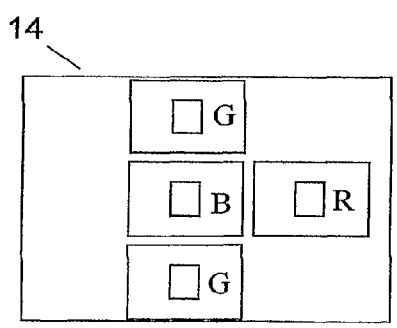
FIG. 17 is a schematic front elevation view of a third LED configuration.

FIGS. 14-17 show examples of practical embodiments of the LED module that may be used in variants of the embodiments illustrated in FIGS. 11-13. FIG. 14 is a front elevation view of a typical commercially available LED device, indicating the dimensions of the substrate and LED die. FIGS. 15-17 show alternative methods of configuring red, green and blue LEDs indicated by the symbols R,G,B.

Figure 18:
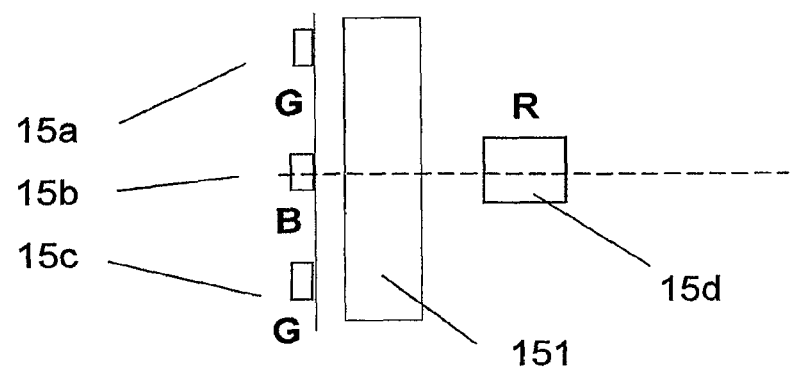
FIG. 18 is a schematic plan view of a LED configuration incorporating a dichroic beam splitter.
Figure 19:
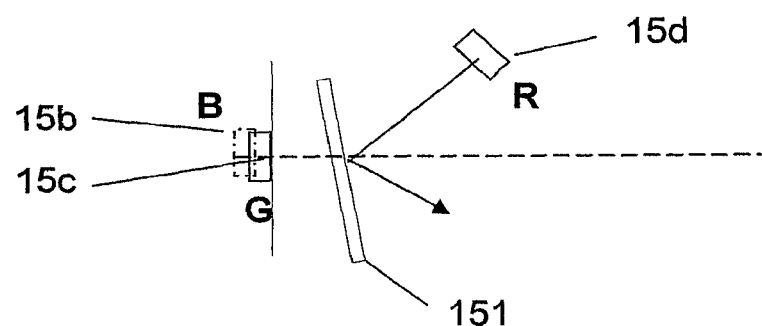
FIG. 19 is a schematic side view of a LED configuration incorporating a dichroic beam splitter.

FIGS. 18-19 illustrate in schematic form a further method of configuring red green and blue LEDs in which FIG. 18 shows a plan view and FIG. 19 shows a side elevation view. In this case the blue and green LEDS 15a,15b,15c are mounted on a common substrate. However, the red LED 15d is introduced into the illumination path by means of a dichroic beam splitter 151.

Figure 20:
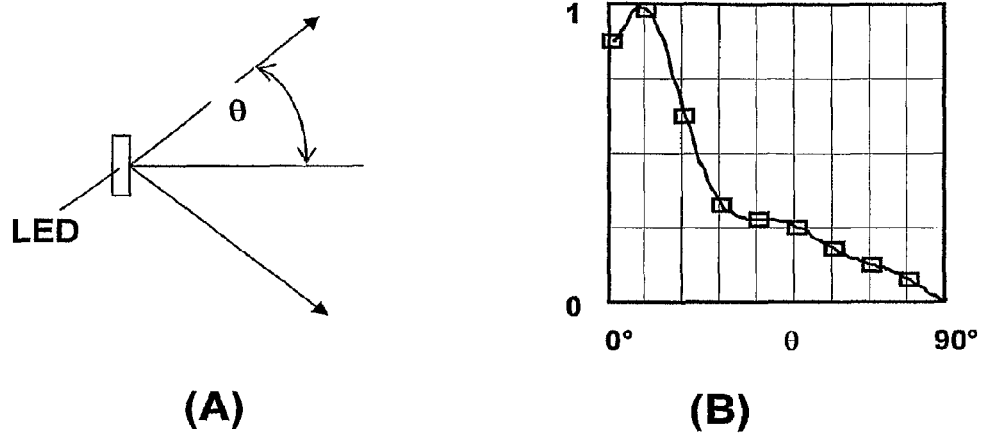
FIG. 20A is a diagram defining LED emission angles used in the charts in FIG. 13B and FIG. 14
FIG. 20B is a chart showing normalized LED intensity as a function of angle.
Figure 21:
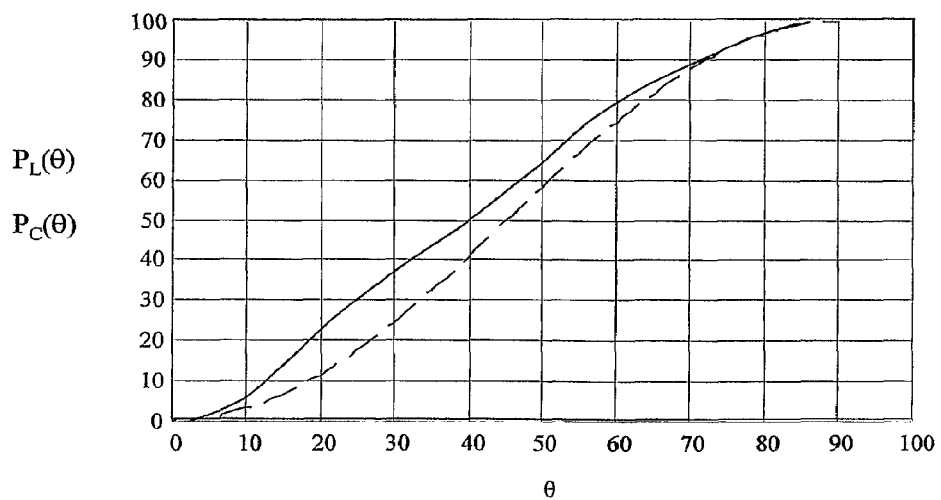
FIG. 21 is a chart showing normalized LED luminous flux as a function of angle.

FIGS. 20-21 illustrate typical characteristics of an exemplary LED source suitable for use with the invention. FIG. 20A defines the angular coordinates. FIG. 20B show typical LED manufacturers data showing the distribution of LED relative intensity as a function of angle. LEDs having the characteristics shown in FIG. 20B are manufactured by Luminus Inc. (USA). FIG. 21 is a chart comparing the percentage of light collected at different angles by the LED of FIG. 20. The percentage of light collected at the same angles by a Lambertian LED is indicated by the dashed line. The invention does not rely on any particular type of LED technology.

Figure 22:
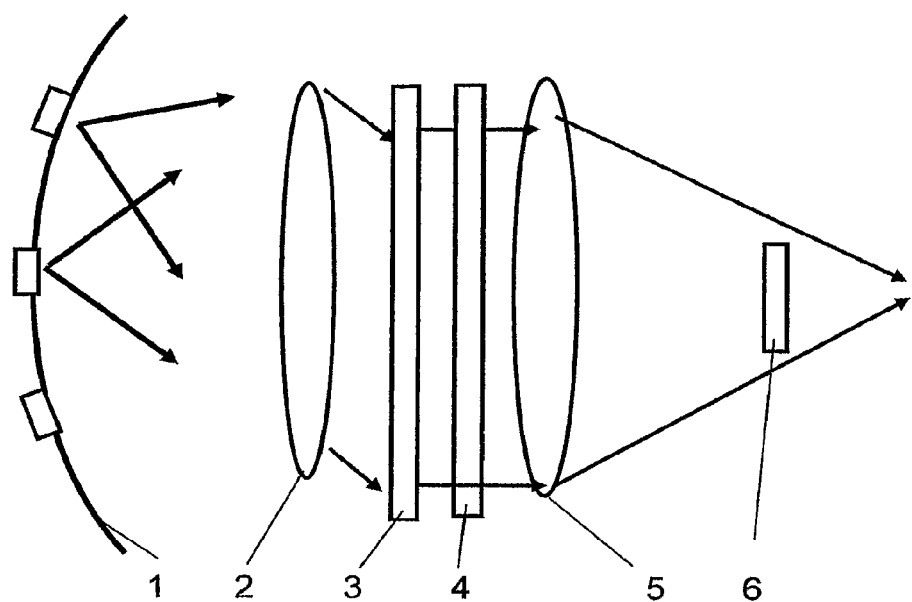
FIG. 22 is a schematic side elevation view of another embodiment of the invention.

FIG. 22 shows a further embodiment of the invention similar to the one illustrated in FIGS. 11-13. As in FIGS. 11-13, the illuminator comprises LED module 1, condenser lens 2, ESBG group 3, DOE 4 and relay lens 5. However, the case of FIG. 22 the LED module 1 comprises LED die disposed on a curved substrate.

Figure 23:
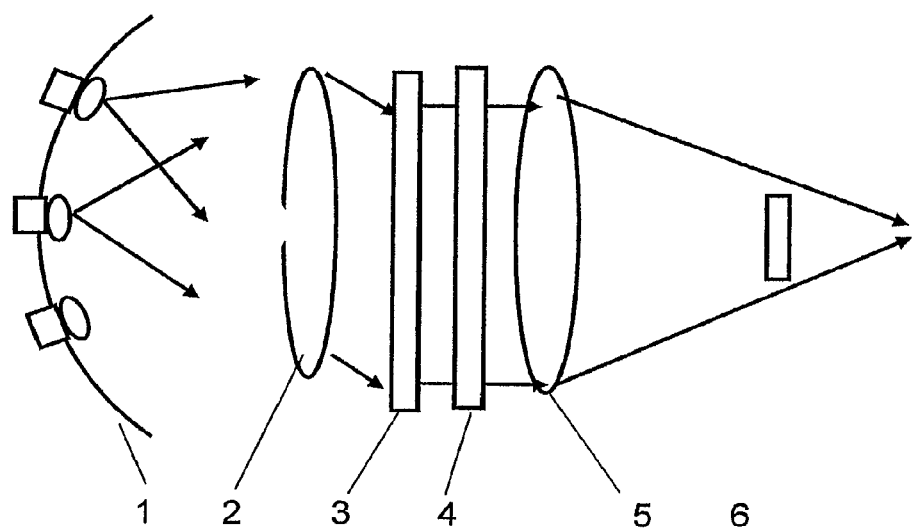
FIG. 23 is a schematic side elevation view of another embodiment of the invention.

FIG. 23 shows a further embodiment of the invention similar to the one illustrated in FIG. 22. As in FIG. 22 the illuminator comprises LED module 1, condenser lens 2, ESBG group 3, DOE 4 and relay lens 5. In the embodiment of FIG. 23 the LEDs are disposed on a curved substrate. The embodiment of FIG. 23 further comprises small optical elements such as the one indicated by 8 positioned in front of each LED die. The optical elements modify the LED emission angular distribution.

Figure 24:
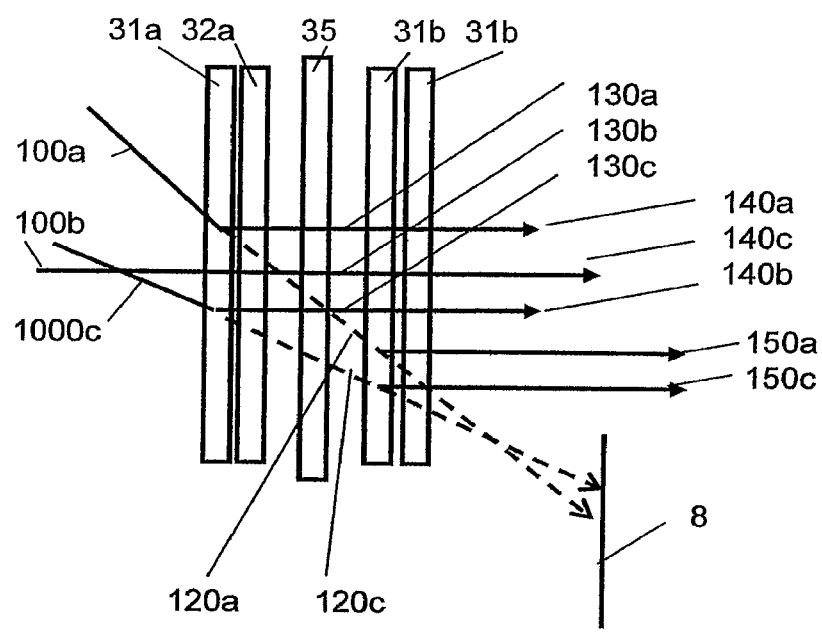
FIG. 24 is a schematic side elevation view of a further embodiment of the invention.

One of the well-known attributes of transmission ESBGs is that the liquid crystal molecules tend to align normal to the grating fringe planes. The effect of the liquid crystal molecule alignment is that ESBG transmission gratings efficiently diffract P polarized light (ie light with the polarization vector in the plane of incidence) but have nearly zero diffraction efficiency for S polarized light (ie light with the polarization vector normal to the plane of incidence. Hence in the embodiments discussed above only P polarized red and green light is transmitted in the viewing direction while the blue light transmitted in the viewing direction will be S-polarized. FIG. 24 shows an alternative ESBG group that may replace any of the ESBG groups illustrated in the earlier embodiments. The modified ESBG group comprises first and second ESBG groups 31a,32a and 31b,31b separated by a half wave plate (HWP) 35. It is well known that half wave plates rotate the polarization of incident light through ninety degrees thereby converted S-polarized light to P-polarized light and vice versa. Said first and second ESBG groups have substantially identical specifications. The first ESBG group diffracts incident P-polarized red and green light 100a,100c into a direction parallel to the optical axis The portion of incident S-polarized red and green light that is not diffracted continues to propagate away from the optical axis in the directions 120a,120c. After propagation through the HWP said diffracted P-polarized red and green light is converted to S-polarized light 120 and is therefore not diffracted by the second ESBG group. It emerges as the light 140a,140c. However, said incident S-polarized red and green light that was not diffracted by the first ESBG group 110a,110c is converted to P-polarized light 120a,120c and is therefore diffracted into the viewing direction 150a,150c by the second ESBG group, which has identical diffracting characteristics to said first ESBG group. Any residual incident red and green light that was not diffracted due to inefficiencies in the ESBGs is converted to S-polarized light and proceeds without deviation through the second ESBG group and then onto a light absorbing stop. The incident blue light 100b is not diffracted by the ESBGs and emerges and both S and P components emerge in the direction 140b.

Figure 25:
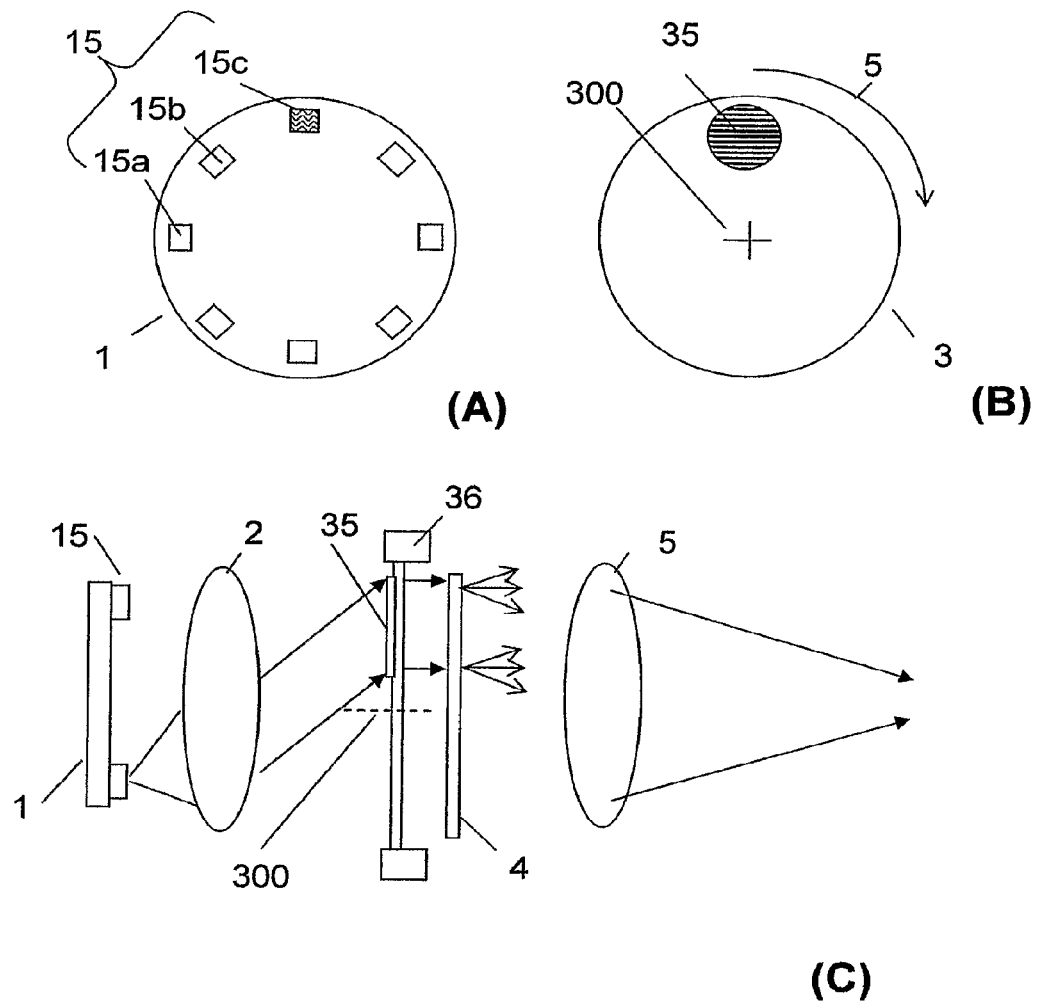
FIG. 25A is a schematic front elevation view of a further embodiment of the invention.
FIG. 25B is a schematic front elevation view of a further embodiment of the invention.
FIG. 25C is a schematic side elevation view of a further embodiment of the invention.
Figure 26:
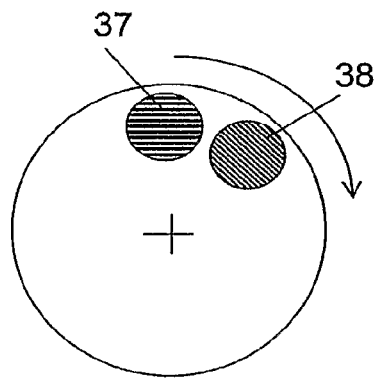
FIG. 26 is a schematic front elevation view of a further embodiment of the invention.
Figure 27:
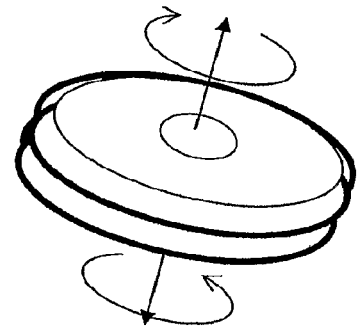
FIG. 27 is a schematic three-dimensional view of a further embodiment of the invention.

In an alternative embodiment of the invention shown in FIG. 25 the ESBGs are disposed on a rotating assembly. As shown in the front elevation view of FIG. 25A the LED module comprises a multiplicity of emitters 15 arranged in a circular pattern on a PCB. In contrast to the earlier embodiments the ESBGs in FIG. 25 are disposed on a rotating substrate 3 containing at least one ESBG 35, as shown in FIG. 25B The ESBG rotates around an axis indicated by 300 in the direction indicated by 5. Desirably, a pancake edge drive motor powers the rotating substrate. However other rotation mechanisms may be used. One possible operational embodiment is shown in FIG. 25C comprising the LED module 1, a collimator lens 2, rotating ESBG assembly 3, pancake edge drive motor assembly 36, CGH 4 and relay lens 5. In one operational embodiment the emitters 15a,15b,15c may correspond to red, green and blue sources. A LED such as, for example, 15C flashes when the ESBG 35 overlaps the cross section of the LED beam path. The sensing mechanism for determining the position of the ESBG does not form part of the invention. By providing a multiplicity of LEDs of each primary color and a corresponding multiplicity of ESBGs the entire aperture of the illumination can be filled with light of each said color. Although a circular ESBG is shown in FIG. 25B, other shapes may be used to maximize throughput. The rotating LED assembly many comprise a stack of red, and blue diffracting layers. In an alternative embodiment shown in FIG. 26 the ESBG comprises two displaced ESBGs 37,38 such that while one ESBG overlaps the beam path of a first LED, the second ESBG is ready to overlap the beam path of an adjacent LED. The embodiments of FIGS. 25-26 have the advantage that the LEDs may be driven at their maximum rating and heat from the LEDs may be dissipated more effectively using a large area heat sink. FIG. 27 shows an alternative embodiment in which two counter rotating ESBGs are provided. The embodiment of FIG. 27 has the advantage of providing more continuous illumination.

Figure 28:
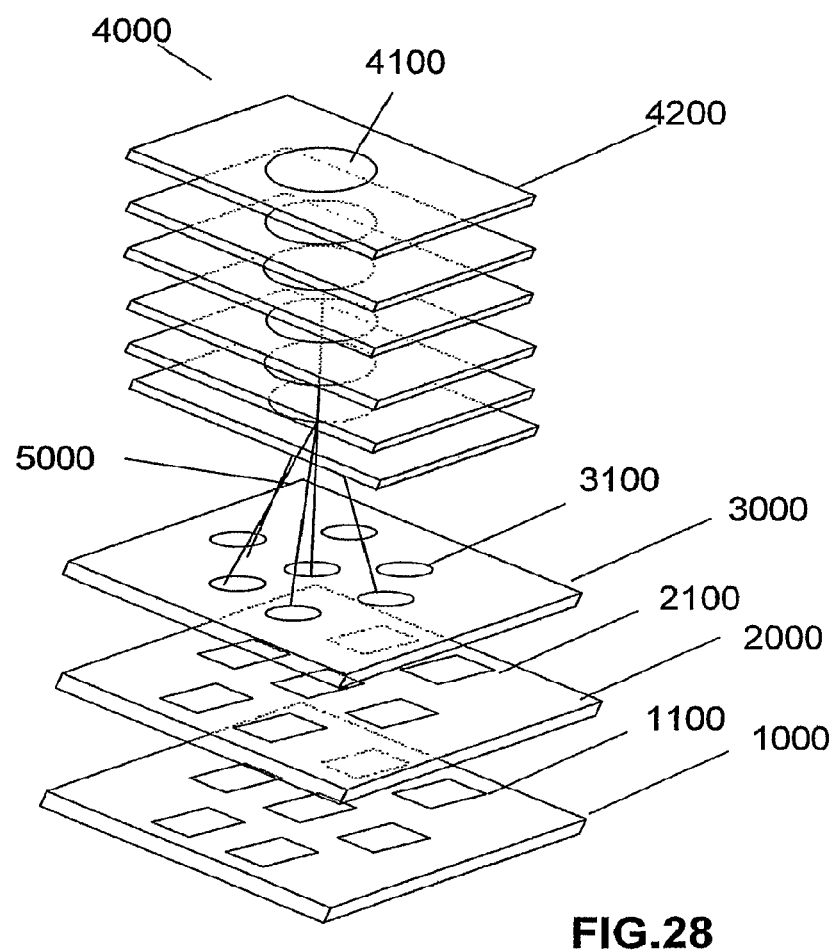
FIG. 28 is a schematic three-dimensional view of a further embodiment of the invention.

In an alternative embodiment of the invention shown in FIG. 28 the illuminator comprises an LED module comprising a substrate 1000 and an array of LED die such as 1100, a PCB 2000 containing apertures 2100, an array of lens elements 3100 on a substrate 3000 and a stack of ESBGs 4000. Said ESBG stack comprises ESBG layers such as the one indicated by 4200. Advantageously, the substrates 2000, 3000 are fabricated from ceramic materials. Multiple holograms may be recorded within each ESBG layer.

In preferred practical embodiments of the invention the ESBG layers in any of the above embodiments would be combined in a single planar multiplayer device. The multilayer ESBG devices may be constructed by first fabricating the separate ESBG devices and then laminating the ESBG devices using an optical adhesive. Suitable adhesives are available from a number of sources, and techniques for bonding optical components are well known. The multilayer structures may also comprise additional transparent members, if needed, to control the optical properties of the illuminator.

It should be noted that in order to ensure efficient use of the available light and a wide color gamut, the ESBG devices should be substantially transparent when a voltage is applied, and preferably should diffract only the intended color without an applied voltage.

The ESBGs may be based on any liquid crystal material including nematic and chiral types.

Figure 29:
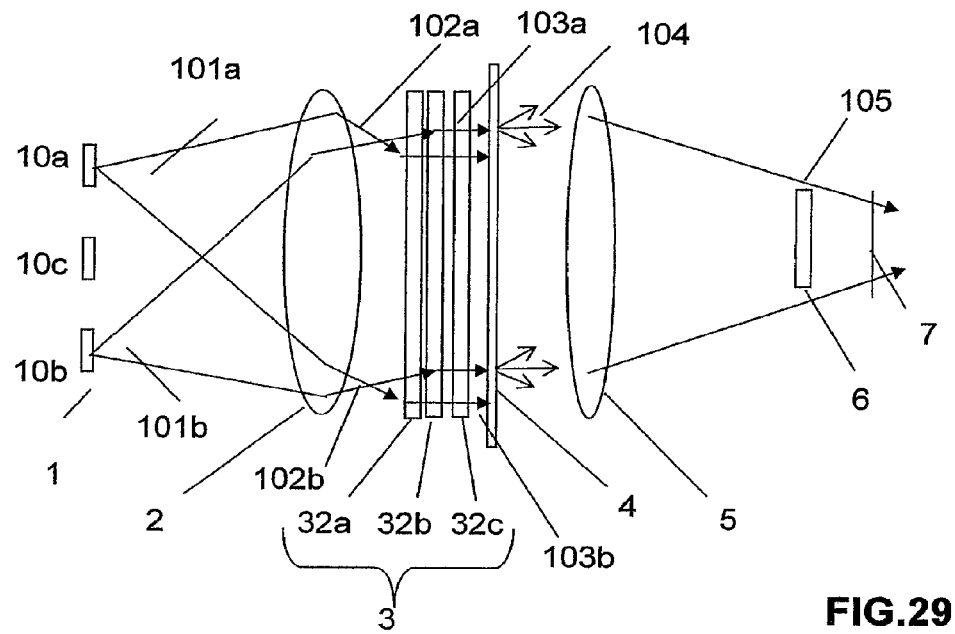
FIG. 29 is a schematic side elevation view of a further embodiment of the invention.
Figure 30:
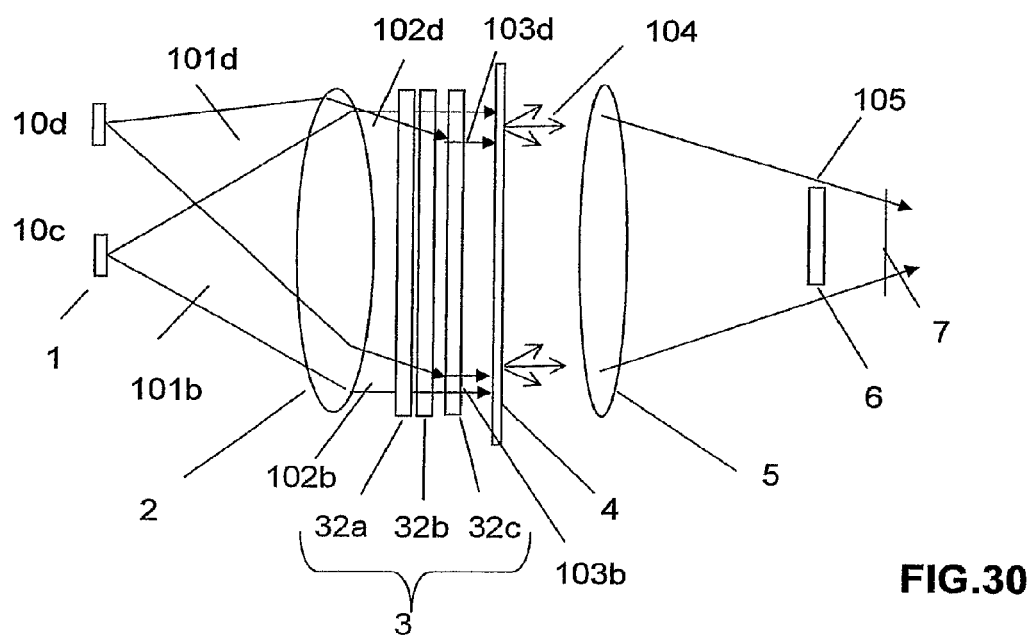
FIG. 30 is a schematic plan view of the further embodiment of the invention in FIG. 27.

The embodiments described above have relied on ESBGs. In alternative embodiments of the invention it is possible to use non-switchable Bragg gratings. In such embodiments the colour sequential illumination is provided by switching red green and blue LEDs in sequence. FIGS. 29-30 are schematic side elevation views of an embodiment of the invention using non-switchable Bragg gratings. In FIGS. 29-30 the green and red diffracting ESBGs 30a,30b,30c of FIGS. 11-12 are replaced by the green and red diffracting non-switchable Bragg gratings 32a,32b,32c. In all other respects the apparatus illustrated in FIGS. 29-30 is identical to the apparatus illustrated in FIGS. 11-12.

Figure 31:
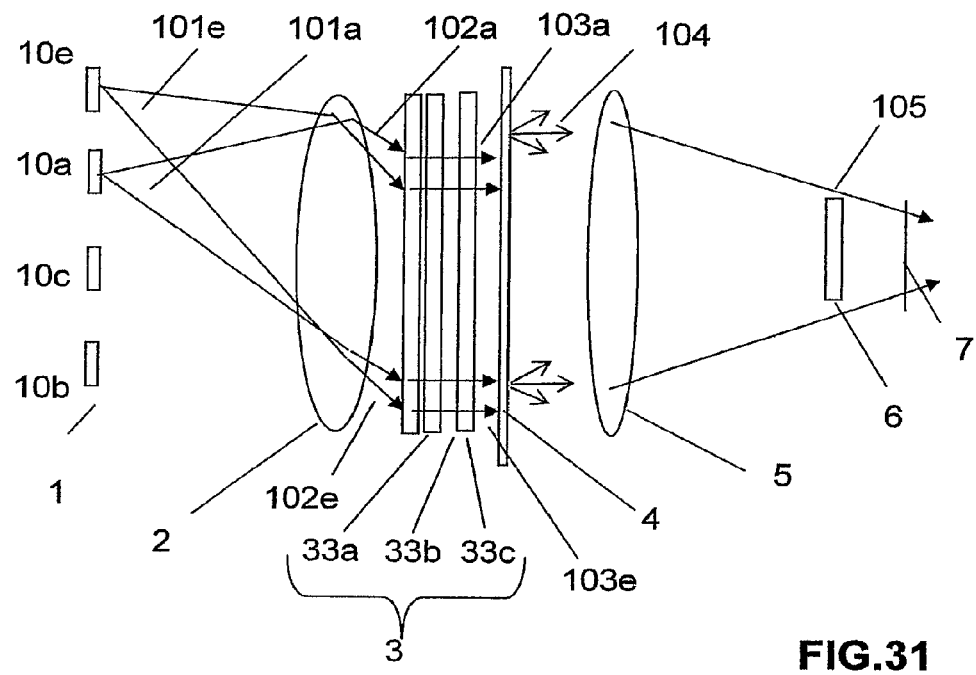
FIG. 31 is a schematic side elevation view of a further embodiment of the invention.

FIG. 31 is a schematic side elevation view of a further embodiment of the invention using non-switchable Bragg gratings. In FIG. 31 the green and red diffracting ESBGs 30a,30b,30c of FIG. 13 are replaced by the green and red diffracting non-switchable Bragg gratings 33a,33b,33c. In all other respects the apparatus illustrated in FIG. 31 is identical to the apparatus illustrated in FIG. 13.

Figure 32:
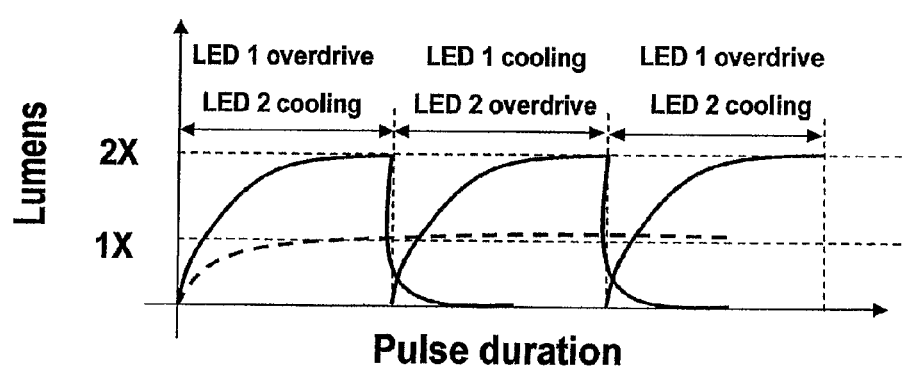
FIG. 32 is a chart illustrating a LED drive scheme for use with the invention.

In any of the ESBG embodiments discussed above more efficient use of LED emission may be achieved by running both LEDs simultaneously using 50% duty-cycle pulse-sequential overdrive. The basic principles are illustrated in FIG. 32, which represents the lumen output from two identical LEDS under two different drive schemes. The basic principles may be understood by considering the configuration of FIGS. 11-12 in conjunction with FIG. 32. In the preferred LED switching scheme represented by the solid lines it will be seen that when the off-axis LED (referred to as LED 1 in FIG. 32) is on, light from the off-axis LED is diffracted on axis by the first ESBG. However, when the optical axis LED (referred to as LED2 in FIG. 32) is on, the ESBG is switched off, that is, into its non-diffracting state. Hence light from the on axis LED is not diffracted by the ESBG and continues to propagate on axis after collimation. A gain of ×2 compared with running the same LEDs in continuous mode as indicated by the dashed line may be achieved using the above strategy. A further benefit is that the larger effective cooling area resulting from two well separated LEDs allows manufacturers' maximum LED drive current ratings to be maintained more efficiently.

Figure 33:
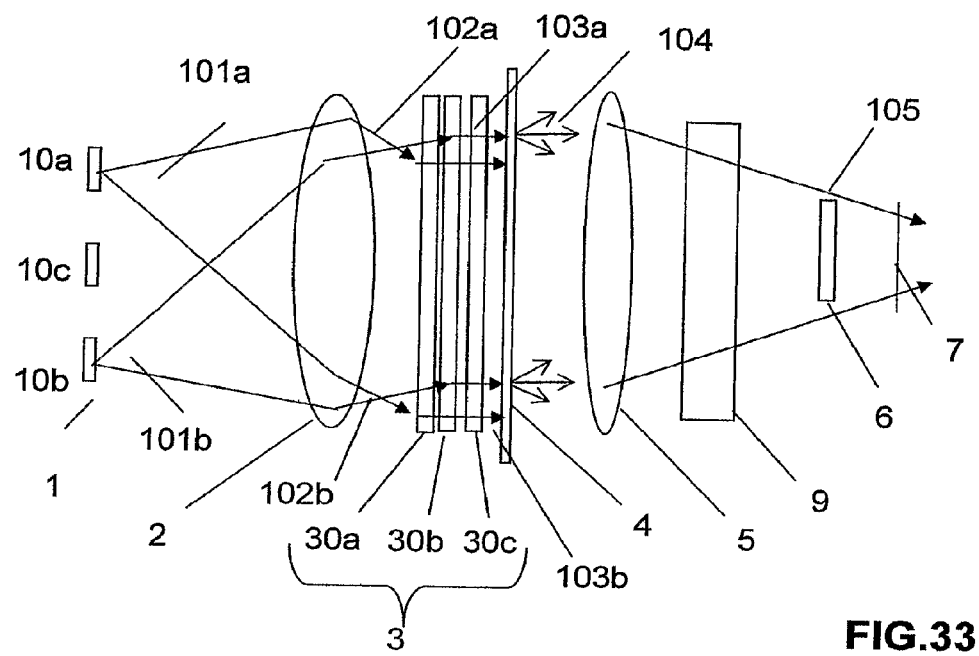
FIG. 33 is a schematic side elevation view of a further embodiment of the invention.
Figure 34:
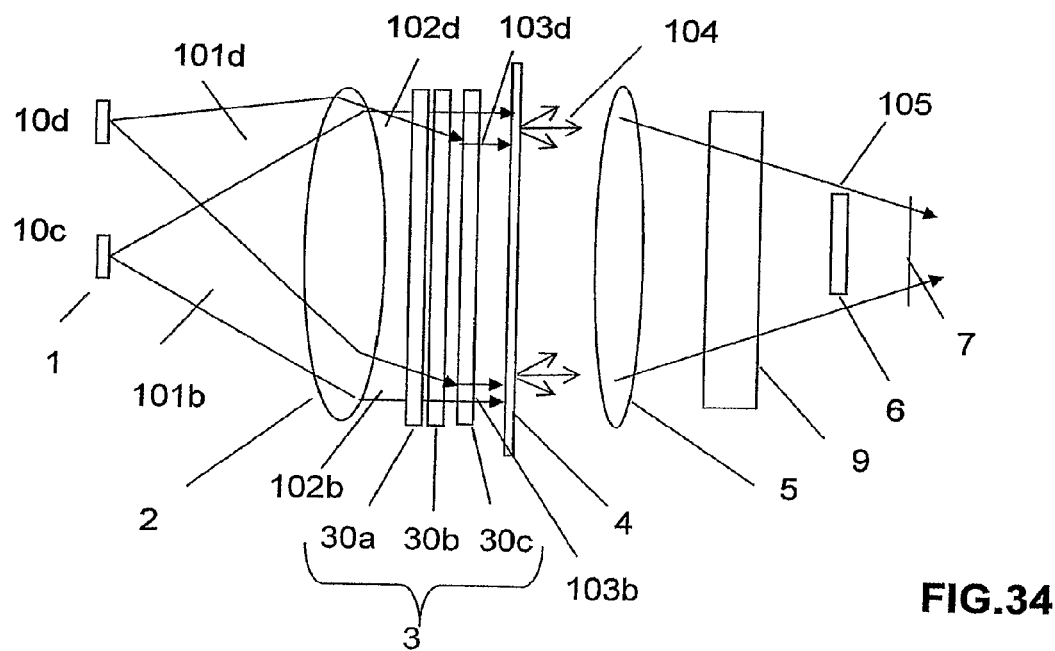
FIG. 34 is a schematic plan view of the further embodiment of the invention in FIG. 31.

The diffraction efficiency of Bragg gratings will depend on the polarization of the incident light. In any of the preceding embodiments of the invention the illuminator may further comprises a polarization rotating filter operative to rotate the polarization of at least one primary colour through ninety degrees. The polarization-rotating filter will typically be disposed in the beam path after the Bragg gratings. By this means it is possible to ensure that the red green and blue components of the illumination have a common polarization direction. This is advantageous in LCD display applications. The polarization-rotating filter may be based on a multilayer thin film coating stack. Alternatively the polarization-rotating filter may be based on a stack of retarders where each retarder has a unique in plane optic axis orientation. One example of a polarization-rotating filter is described in U.S Patent Publication No. 20030107809 by Chen et al., published in Jun. 12, 2003. Practical polarization rotating filters are manufactured by ColorLink Inc. (Boulder, Colo.). For example, FIGS. 33-34 are schematic side elevation views of an embodiment of the invention similar to that of FIGS. 11-12. FIGS. 33-34 further comprises a polarization-rotating filter 9. In all other respects the apparatus illustrated in FIGS. 33-34 is identical to the apparatus illustrated in FIGS. 11-12. It should be noted that the invention does not rely on any particular type of polarization rotation filter.

Figure 35:
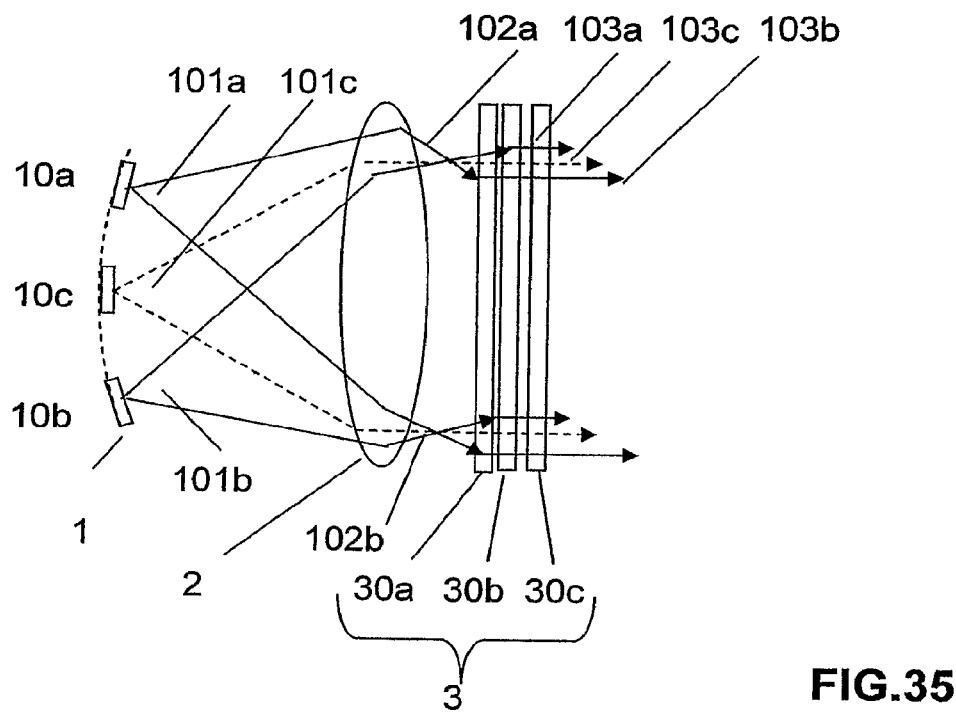
FIG. 35 is a schematic side elevation view of a further embodiment of the invention.

In of the above embodiments the emitting surfaces of the LEDs may be configured to lie on a non-planar surface such as a spherical, conic or other aspheric type of surface. The surface need not necessarily be axis symmetric. Said surface may be comprised of tilted planes. Alternatively the LEDs may be mounted on pillars attached to a substrate. For example FIG. 35 is a schematic side elevation view of a further embodiment of the invention similar to the embodiment of FIGS. 5-6. In the said embodiment the emitting surfaces of the LEDs lie on a spherical surface.

Figure 36:
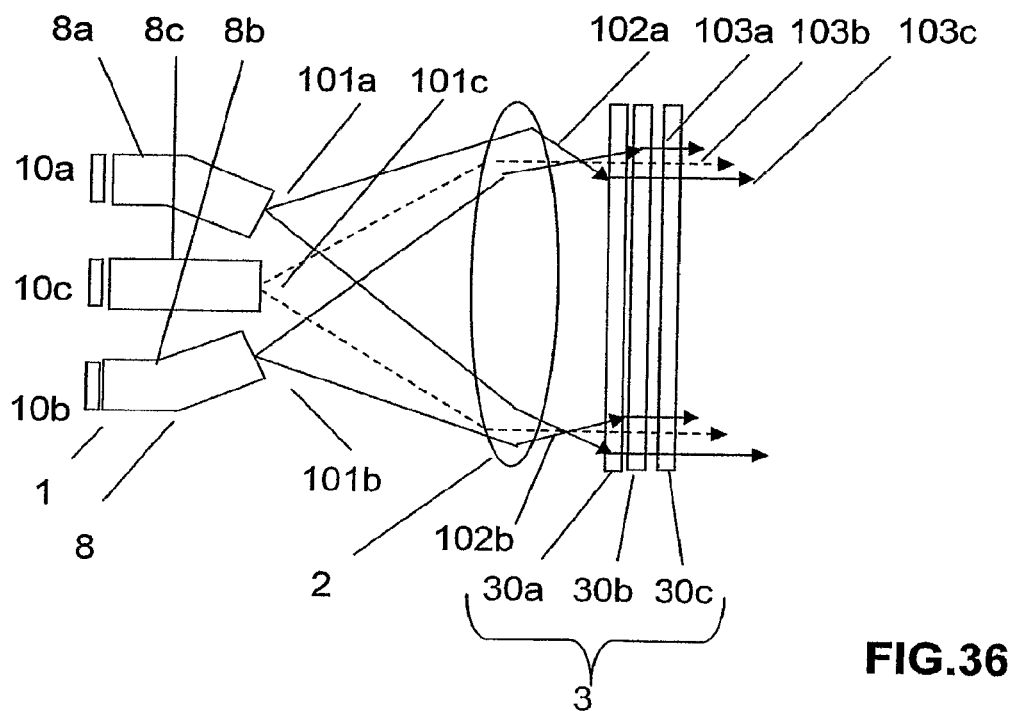
FIG. 36 is a schematic side elevation view of a further embodiment of the invention.

FIG. 36 is a schematic side elevation view of a further embodiment of the invention in which light from the LEDs is piped to three secondary emissive surfaces by means of light guides 8a,8b,8c. In all other respects the embodiment of FIG. 36 is identical to that of FIGS. 5-6. Such light guides may be used with any of the embodiments of the invention. The advantage of using light guides is that the LEDs can be configured on a plane substrate allowing more efficient thermal management. The waveguides will contribute to the homogenisation of the illumination intensity profile and will make the illuminator much less sensitive to LED defects. Using a tapered liquid has the advantage of allowing the illumination beam aspect ratio to be matched to that of the microdisplay panel without using anomorphic lenses.

Figure 37:
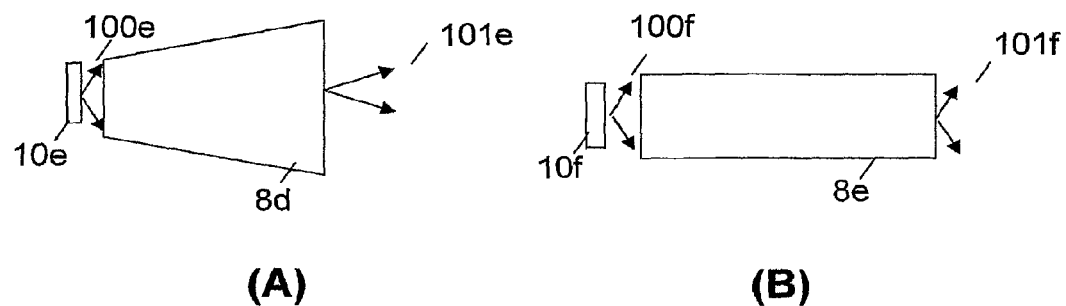
FIG. 37 is a schematic side elevation view of a further embodiment of the invention.

FIGS. 37A-37B shows example of light guides that may be used with the invention. FIG. 37A is a schematic side elevation view of a tapered light guide 8d. Light from the LED 10e is emitted from the light guide with an emission angle 101e. The emission angle from the light guide 101e is smaller than the LED emission angle 100e. FIG. 37B is a schematic side elevation view of a non-tapered light guide 8e. Light from the LED 10f is emitted from the light guide with an emission angle 101f. The emission angle from the light guide 101f is smaller than the LED emission angle 100f. A non-tapered light guide may be based on a rectangular or cylindrical form. Any of the above light guides may be hollow light guides. The solid light guides may be fabricated from glass or optical plastics. The light guides may rely on the principles of total internal reflection or may use mirror coatings. The light guides may be curved. The light guides may contain folding mirrors to provide more compact configurations.

Figure 38:
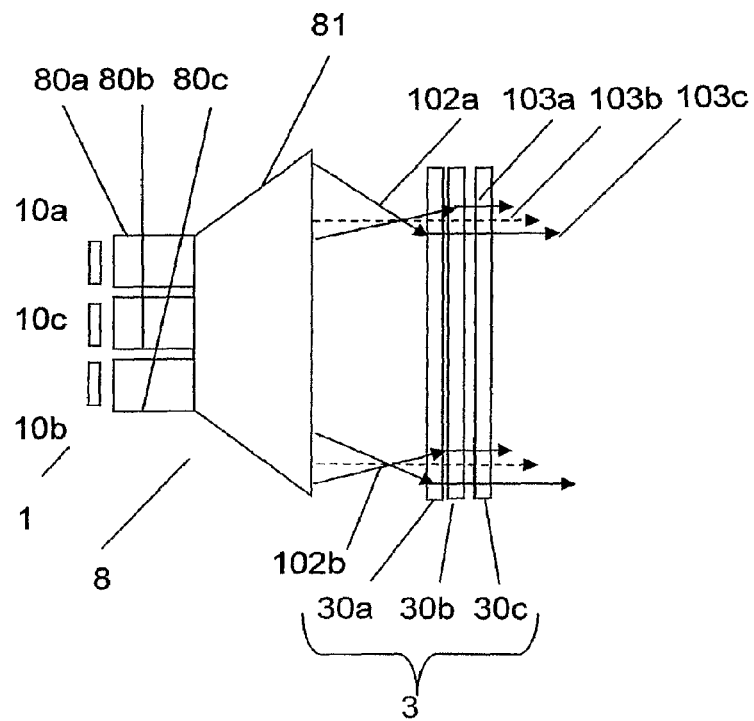
FIG. 38 is a schematic side elevation view of a further embodiment of the invention.

FIG. 38 is a schematic side elevation view of an embodiment of the invention in which the lens 2 is replaced by a light guide device, which performs the dual function of light guiding and collimation. The light guide device comprises light guides 80a,80b,80c coupled to the LEDs 10a,10b,10c. Said light guides are coupled to a light guiding and collimating element 81. In all other respects the embodiment of FIG. 38 is identical to that of FIGS. 5-6. Said element 81 may be a tapered light guide similar to that shown in FIG. 37A. The element may incorporate folding mirrors. The element 81 may incorporated one or more diffractive surfaces. The element may incorporate curved refracting surfaces. The element may be air separated from the light guides. The light guides may be oriented at angles to the input surface of the element 81.

Figure 39:
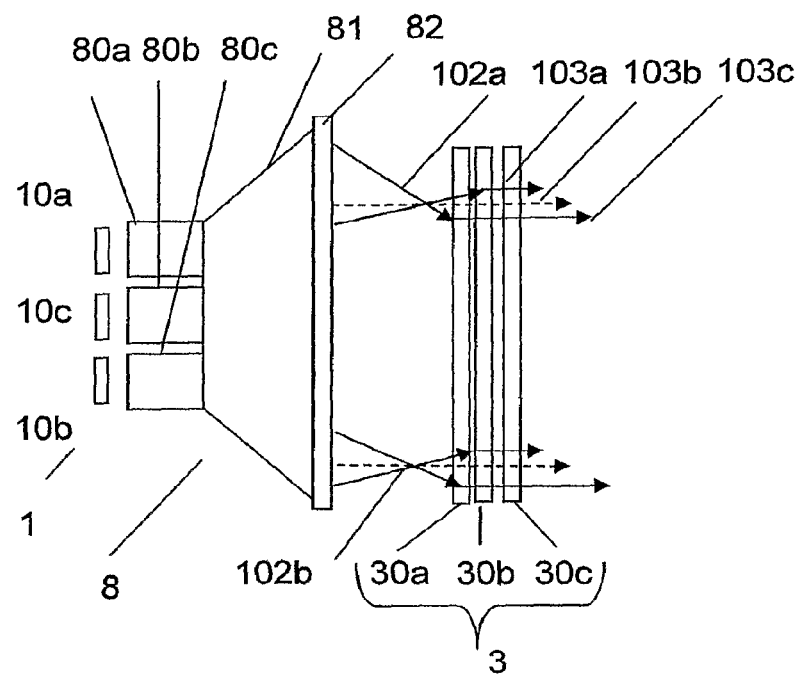
FIG. 39 is a schematic side elevation view of a further embodiment of the invention.

FIG. 39 is a schematic side elevation view of an embodiment of the invention similar to that of FIG. 38 in which the element 8 further comprises a DOE 82 adjacent to the output surface of the element 81.

Figure 40:
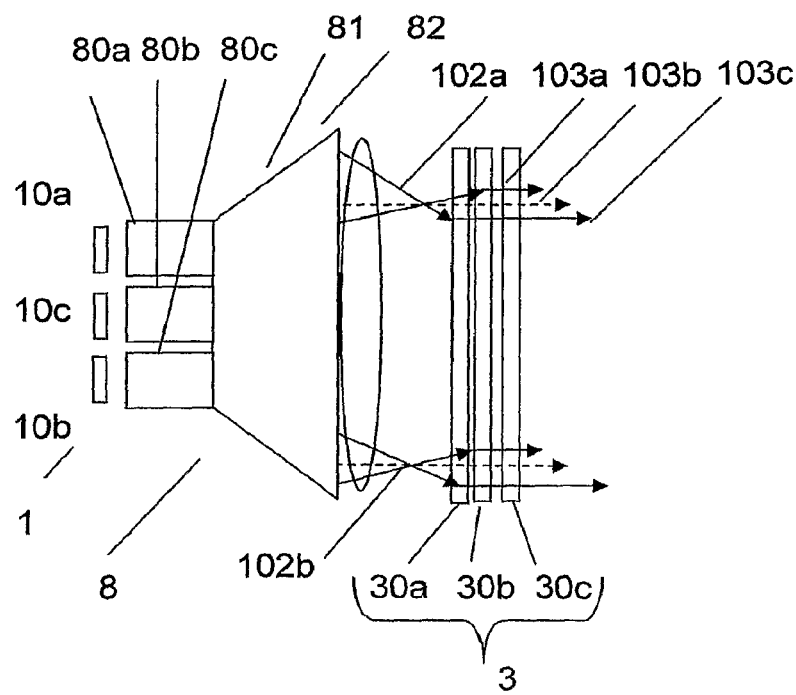
FIG. 40 is a schematic side elevation view of a further embodiment of the invention.

FIG. 40 is a schematic side elevation view of an embodiment of the invention similar to that of FIG. 38 in which the element 8 further comprises a refractive optical element 83 adjacent to the output surface of the element 81.

In each of the embodiments discussed above it is found that the procedure of introducing red and green illumination at different angles to the viewing direction and introducing blue light along the viewing direction is the most desirable in terms of providing high image contrast. However, it should be emphasized that the invention is not restricted to any particular combination of wavelengths and angles. Typically, to achieve a satisfactory display white point it is necessary to provide significantly more green than red or blue. For example to achieve a white point characterised by a colour temperature of 8000K we require the ratio of red:green:blue to be approximately 39:100:6. It is found in practice that providing adequate lumen throughput and white point simultaneously requires more that one green source.

Figure 41:
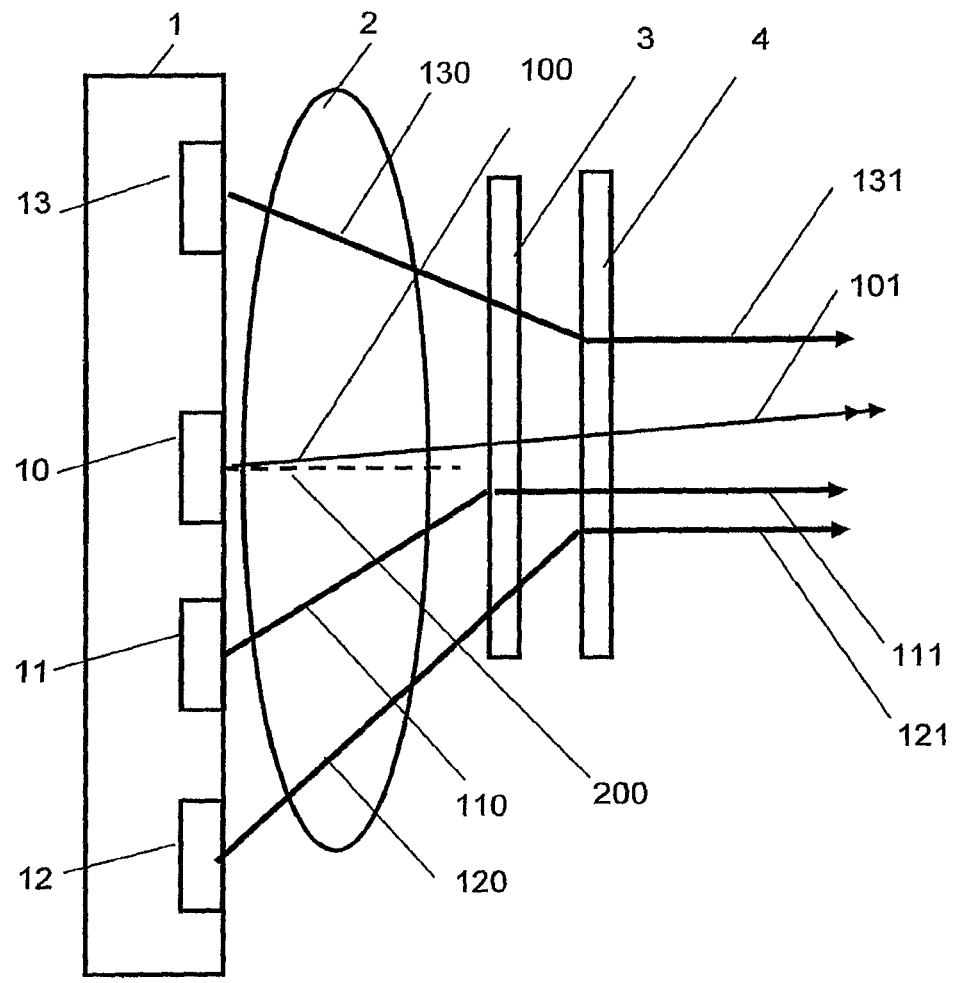
FIG. 41 is a schematic side elevation view of a yet further embodiment of the invention.

A schematic side elevation view of a further embodiment of the invention is shown in FIG. 41. An illumination device according to the principles of the invention comprises in series a LED assembly 1, a collimating lens 2, a first Bragg grating 3 and a second Bragg grating 4. The LED assembly further comprises the green LEDs 10,11, a red LED 12 and a green LED 13. A general illumination direction is defined by the normal 200 to the surface of the Bragg grating. The Bragg grating is recorded by means of a first recording laser beam incident normal to the grating plane and a second recording laser beam incident at an angle to the grating plane. The lens 2 collimates and directs light 100 from said first green LED 10 towards said Bragg grating at a first angle. The lens collimates and directs light 110 from said second green LED 11 towards said Bragg grating at a second angle. The second angle is substantially equal to the incidence angle of said second recording beam. Light from the second LED is then diffracted along the direction 111 parallel to the illumination direction 200. The Bragg grating has a maximum acceptance angle for light beams whose average direction corresponds to that of said first recording beam. Said acceptance angle is defined by the angle at which the diffraction efficiency of said grating falls to a predetermined value. Typically said value may be around 10% of the peak diffraction efficiency. As will be explained below, in order to avoid diffracting light out of the illumination direction the first angle should greater than said maximum acceptance angle of the Bragg grating.

The second Bragg grating is a single layer holographic medium into which superimposed third and fourth gratings have been recorded; The basic principles of recording multiple gratings into a holographic medium are well known to those skilled in the art of holography and are explained in texts such as "Optical Holography: Principles, techniques and applications" by P. Hariharan, published in 1996 by Cambridge University Press. The collimator collimates and directs light from the red LED 12 at a third angle with respect to said second Bragg grating. The collimator also collimates and directs light from the blue LED 13 at a third angle with respect to the second Bragg grating. The second Bragg grating then diffracts said red and blue light is diffracted into the illumination direction.

Figure 42:
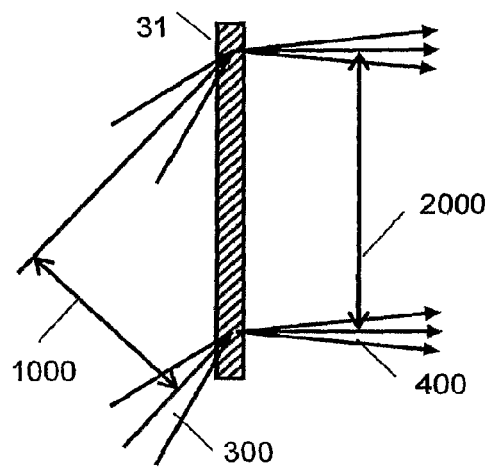
FIG. 42 is a schematic side elevation view illustrating elements of said yet further embodiment of the invention.
Figure 43:
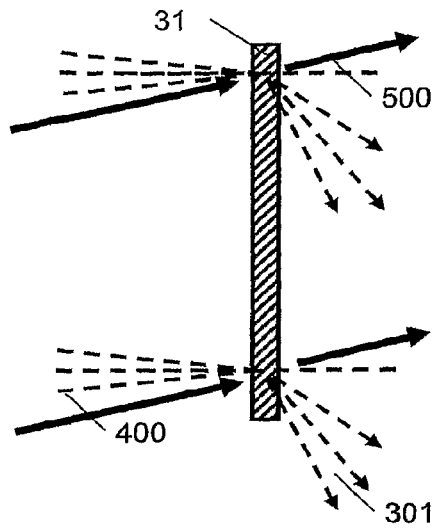
FIG. 43 is a schematic side elevation view illustrating elements of said yet further embodiment of the invention.

The significance of the acceptance angle of the first grating in relation to light from the first LED 10 may be appreciated by considering FIGS. 42-43. Turning first to FIG. 42, the schematic side elevation shown therein illustrates the diffraction efficiency angular bandwidths of a Bragg grating 31 recorded using the procedure described above. Applying etendue constraints to such a Bragg grating gives a narrower beam width 1000 and a wider divergence of rays 300 around the first recording angle and a wider beam width 2000 and smaller ray divergence 400 around the second recording angle. It should be noted that the ray paths are reversible as shown by the ray paths indicated by 301 and 401 in FIG. 43. FIG. 43 also indicates the path of an undeviated ray 500 that falls outside the angular bandwidth of the grating 31.

Figure 44:
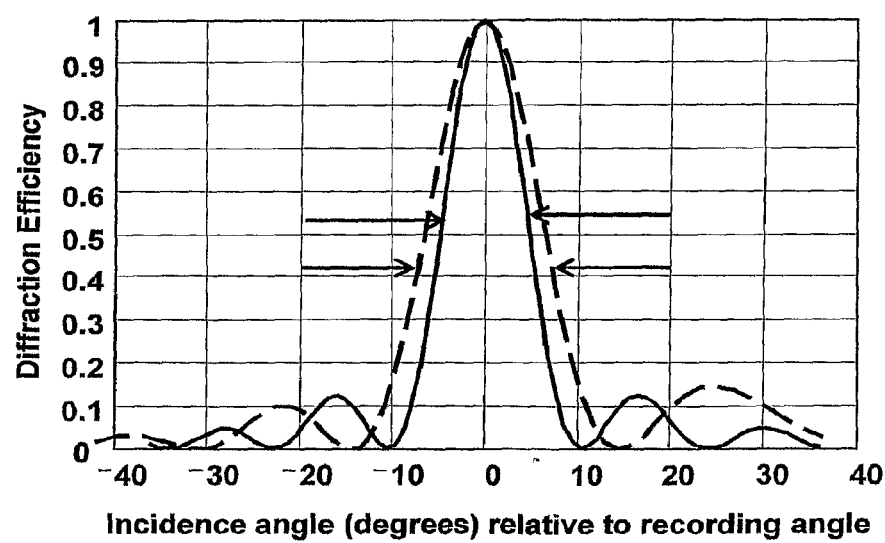
FIG. 44 is a chart showing characteristics of one particular embodiment of said yet further embodiment of the invention.

FIG. 44 is a chart showing the diffraction efficiency as function of angle for the rays 300 represented by the solid line, and the rays 400 represented by the dashed line. In the particular example shown in FIG. 44 the SBG has a refractive index modulation equal to 0.085, a first recording angle of 0°, and a second recording angle of 40°. The Bragg wavelength is 525 nanometers and the grating thickness is 5 microns. The FWHM bandwidth equivalent to the acceptance angle 300 is approximately 14° while the FWHM bandwidth 1400 equivalent to the acceptance angle 400 is approximately 9°.

It will be clear from consideration of FIG. 43 that rays 100 incident at angles close to the first recording angle will be diffracted out of the illumination path. This problem may be avoided by ensuring that the incident rays 100 lie just outside the angular acceptance band represented by the rays 300. As indicated in FIG. 43 the rays 100 propagate without deviation to emerge from the grating as the rays 101.

It should also be clear from consideration of FIG. 43 that in order to avoid divergence of the two green output beams characterised by rays 101,111, it is necessary to make the grating angular bandwidth 400 as small as possible. According to the Kogelnik theory of Bragg holograms reducing the angular bandwidth requires that the grating thickness is increased and the refractive index modulation decreased. The basic principles of Kogelnik theory are presented in texts such as "Optical Holography: Principles, techniques and applications" by P. Hariharan, published in 1996 by Cambridge University Press.

Desirably the invention the Bragg grating of FIG. 43 is an Electrically Switchable Bragg Grating (ESBG).

One of the well-known attributes of transmission ESBGs is that the liquid crystal molecules tend to align normal to the grating fringe planes. The effect of the liquid crystal molecule alignment is that ESBG transmission gratings efficiently diffract P polarized light (ie light with the polarization vector in the plane of incidence) but have nearly zero diffraction efficiency for S polarized light (ie light with the polarization vector normal to the plane of incidence. Hence in the embodiments of FIG. 41 only P polarized red and green light is transmitted in the viewing direction while the blue light transmitted in the viewing direction will be S-polarized.

Figure 45:
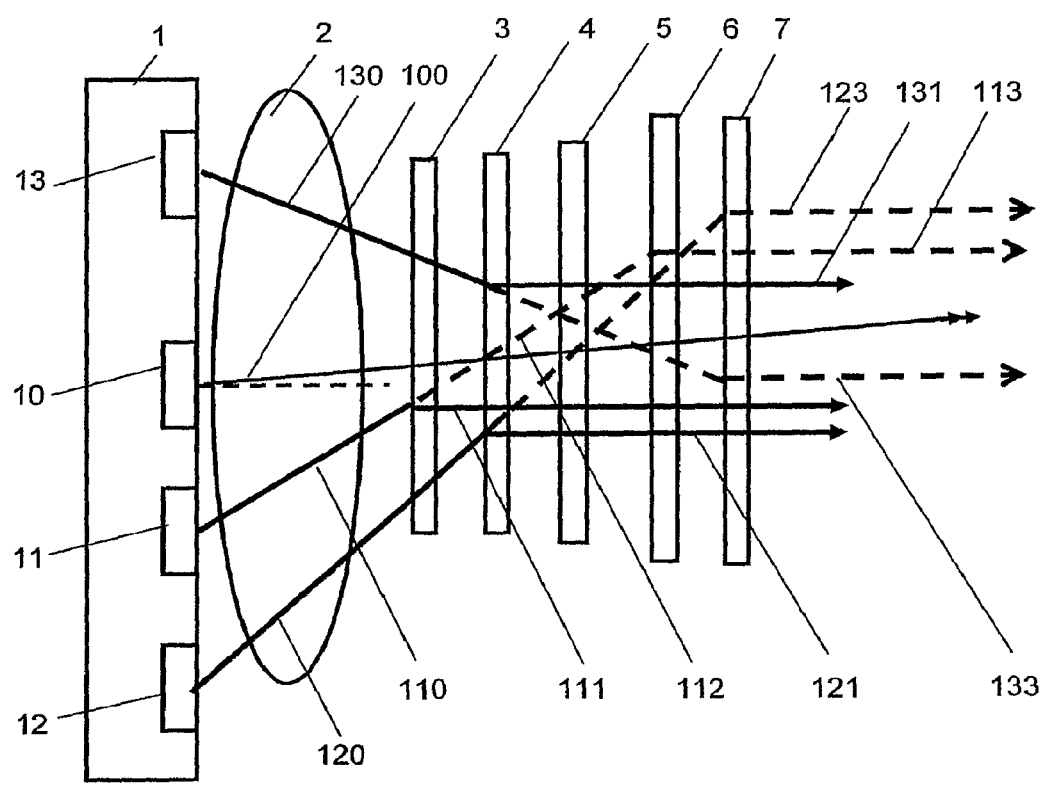
FIG. 45 is a schematic side elevation view of a particular embodiment of the invention.

In a further embodiment of the invention shown in FIG. 45 the Bragg gratings 3 and 4 are both ESBGs. The apparatus further comprises in series a half wave plate 5, a third ESBG 6 and a fourth ESBG 7. The third ESBG 6 has an identical optical specification to said first ESBG 3. The fourth ESBG 7 has an identical optical specification to said second ESBG 4. It is well known that half wave plates rotate the polarization of incident light through ninety degrees thereby converted S-polarized light to P-polarized light and vice versa.

The first grating 3 diffracts incident P-polarized green light 110 into a direction 111 parallel to the illumination direction. The portion of incident S-polarized green light that is not diffracted continues to propagate away from the illumination direction in the directions 112. After propagation through the HWP said diffracted P-polarized green light is converted to S-polarized light 111 and is therefore not diffracted by the third and fourth grating s. It emerges as the light 111. However, said incident S-polarized green light that was not diffracted by the first grating is converted to P-polarized light 113 and is therefore diffracted into the illumination direction by the third grating 6, which has identical diffracting characteristics to the first grating. Any residual incident light that was not diffracted due to inefficiencies in the gratings is converted to S-polarized light and proceeds without deviation through the third and fourth gratings and then onto a light-absorbing stop, which is not shown.

The second grating 4 diffracts incident P-polarized red and blue light 120,130 into directions 121, 131 parallel to the illumination direction. In each case the portion of incident S-polarized red and blue light that is not diffracted continues to propagate away from the illumination direction in the directions 122,132. After propagation through the HWP said diffracted P-polarized red and blue light is converted to S-polarized light and is therefore not diffracted by third and fourth grating and emerges as the light 121, 131. However, said incident S-polarized red and blue light that was not diffracted by the second grating is converted to P-polarized light 122,132 and is therefore diffracted into the viewing direction by the fourth grating 6, which has identical diffracting characteristics to the second grating. Any residual incident light that was not diffracted due to inefficiencies in the grating s is converted to S-polarized light and proceeds without deviation through the third and fourth gratings and then onto a light-absorbing stop, which is not shown. Green Light 100 from the LED 10 lies outside the angular diffraction bandwidths of the first and third SBGs and therefore is not affected by any of the gratings.

It will be clear from consideration of the embodiments of FIGS. 41-45 that there are many possible configurations for combining red, green and blue LEDs. The best configuration will be determined from considerations of thermal management, form factor and optical efficiency.

Although the embodiments of FIGS. 41-45 have been described in terms of providing illumination from two green, on blue and one red source, the invention is equally applicable to other illumination schemes in which more than sources of any primary colour are combined.

Any of the above-described embodiments illustrated in FIGS. 3-45 may further comprise in series a diffuser layer designed to scatter incident light rays into a specified distribution of ray directions. The diffuser may be fabricated from conventional diffusing materials. Alternatively, the diffuser may be a holographic optical element such as, for example, a Light Shaping Diffuser manufactured by Precision Optical Corporation. Alternatively the required diffusion properties may be encoded into one or more of the SBGs described above. Alternatively, The diffuser may be a Computer Generated Holograms design to covered input light comprising separated collimated and divergent components into a uniform intensity output beam.

It should be emphasized that FIGS. 3-45 are exemplary and that the dimensions have been exaggerated. For example thicknesses of the grating layers have been greatly exaggerated.

Further operational embodiments of the invention may use a light control film to block stray light that would otherwise reduce contrast and degrade color gamut. Since practical Bragg gratings do not achieve the 100% theoretical diffraction efficiency of Bragg gratings, the displayed imagery may be degraded by zero order (or non-diffracted light) and spurious diffracted light arising from the diffraction of more than one wavelength by the gratings in the illumination-directing device. Further, the diffraction efficiency versus incidence angle characteristic of transmission gratings will exhibit secondary diffraction maximum to both sides of the primary diffraction peak. While the peak diffraction efficiency of these secondary peaks will be small, effect may be sufficient to reduce the color purity of the display. One known light control film manufactured by 3M Inc. (Minnesota) comprises an array of micro-sphere lenses embedded in a light-absorbing layer. Each lens provides a small effective aperture such that incident rays substantially normal to the screen, are transmitted with low loss as a divergent beam while incident rays, incident at an off axis angle, are absorbed. Other methods of providing a light control film, such as louver screens may be used as an alternative to the light control film described above.

It will be clear from consideration of the FIGS. that the optical systems used to implement the system may be folded by means of mirrors in order to provide more compact configurations. It will also be clear from consideration of the FIGS. that mirrors and sliding mechanisms know to those skilled in the art of opto-mechanical systems may be used to compress the optical system into a compact carrying configuration.

Although the invention has been discussed with reference to LED light sources, all of the embodiments of the invention may be applied with laser light sources.

Although the invention has been described in relation to what are presently considered to be the most practical and preferred embodiments, it is to be understood that the invention is not limited to the disclosed arrangements, but rather is intended to cover various modifications and equivalent constructions included within the spirit and scope of the invention.

What is claimed is:

1. An illumination device comprising:
a first light source characterized by a first wavelength;
a second light source characterized by said first wavelength;
a collimating lens; and
a first Bragg grating formed by means of a first recording beam incident at a first angle to said grating and a second recording beam incident at a second angle to said grating;
wherein said lens collimates and directs light from said first light source towards said grating at said first angle;
wherein said lens collimates and directs light from said second light source towards said grating at said second angle;
wherein said first angle lies within the angular range within which the diffraction efficiency of said grating varies between predefined minimum values and a predefined maximum value,
wherein said second angle lies near to a limit of said angular range,
wherein the propagation direction of the diffracted portion of light incident on said grating at said first angle and the propagation direction of the non-diffracted portion of light incident on said grating at said second angle are approximately collinear; and
wherein first grating diffracts said second angle light.

2. The illumination device of claim 1 further comprising: a holographic optical element into which superimposed third and fourth Bragg gratings have been recorded; a third light source emitting light of a second wavelength; and a fourth light source emitting light of a third wavelength; wherein said lens collimates and directs said second wavelength light at a third angle with respect to said holographic optical element, wherein said lens collimates and directs said third wavelength light at a fourth angle with respect to said holographic optical element, and wherein said holographic optical element diffracts said second and third wavelength light along said illumination axis.

3. The apparatus of claim 1 wherein said Bragg grating is an Electrically Switchable Bragg Grating (ESBG).

4. The apparatus of claim 2 wherein said first Bragg grating is a first ESBG and said holographic optical element is a second ESBG.

5. An illumination device comprising:
a first light source characterized by a first wavelength;
a second light source characterized by said first wavelength;
a collimating lens;
a first Bragg grating formed by means of a first recording beam incident at a first angle to said grating and a second recording beam incident at a second angle to said grating;
a holographic optical element into which superimposed third and fourth Bragg gratings have been recorded;
a third light source emitting light of a second wavelength; and a fourth light source emitting light of a third wavelength; and
further comprising in series a half wave plate; a third ESBG and a fourth ESBG, wherein said third ESBG is identical to said first ESBG and said fourth ESBG is identical to said second ESBG;
wherein said lens collimates and directs said second wavelength light at a third angle with respect to said holographic optical element,
wherein said lens collimates and directs said third wavelength light at a fourth angle with respect to said holographic optical element,
wherein said holographic optical element diffracts said second and third wavelength light along said illumination axis
wherein said lens collimates and directs light from said first light source towards said grating at said first angle;
wherein said lens collimates and directs light from said second light source towards said grating at said second angle;
wherein said first angle lies within the angular range within which the diffraction efficiency of said grating varies between predefined minimum values and a predefined maximum value,
wherein said second angle lies near to a limit of said angular range, wherein the propagation direction of the diffracted portion of light incident on said grating at said first angle and the propagation direction of the non-diffracted portion of light incident on said grating at said second angle are approximately collinear; and
wherein first grating diffracts said second angle light.

6. The illumination device of claim 1 wherein said first and second light sources are LEDs.

7. The illumination device of claim 2 wherein said third and fourth light sources are LEDs.

8. The illumination device of claim 1 wherein said first and second light sources are lasers.

9. The illumination device of claim 2 wherein said third and fourth light sources are lasers.

10. The illumination device of claim 1 wherein said angular limit is a full width half maximum limit of the diffraction efficiency versus angle characteristic of said grating.

11. The illumination device of claim 1 wherein said first and second light sources are disposed on a curved substrate.

12. The illumination device of claim 1 wherein beam shaping optical elements are disposed between each said first and second light sources and said condenser lens.

13. The illumination device of claim 1 further comprising a beam shaping diffractive optical element.

14. The illumination device of claim 1 further comprising a light guiding element for controlling the illumination beam angle.

15. The illumination device of claim 1 further comprising a dichroic beamsplitter.

16. The illumination device of claim 1 used to illuminate a microdisplay.

* * * * *

UNITED STATES PATENT AND TRADEMARK OFFICE
CERTIFICATE OF CORRECTION

PATENT NO. : 9,464,779 B2
APPLICATION NO. : 14/134681
DATED : October 11, 2016
INVENTOR(S) : Milan Momcilo Popovich et al.

Page 1 of 1

It is certified that error appears in the above-identified patent and that said Letters Patent is hereby corrected as shown below:

In the Specification

Column 1, Line 11:
After "United Kingdom patent application"
Delete "No. GB 516063.5" and
Insert -- No. GB 522968.7 --.

Signed and Sealed this
Fourth Day of April, 2017

Michelle K. Lee
*Director of the United States Patent and Trademark Office*